(12) United States Patent
Robertson et al.

(10) Patent No.: US 6,968,511 B1
(45) Date of Patent: Nov. 22, 2005

(54) GRAPHICAL USER INTERFACE, DATA STRUCTURE AND ASSOCIATED METHOD FOR CLUSTER-BASED DOCUMENT MANAGEMENT

(75) Inventors: George G. Robertson, Seattle, WA (US); Mary P. Czerwinski, Woodinville, WA (US); Daniel C. Robbins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 10/092,458

(22) Filed: Mar. 7, 2002

(51) Int. Cl.$^7$ .............................................. G06F 3/00
(52) U.S. Cl. .................... 715/835; 715/788; 715/789; 715/526; 715/790; 715/848
(58) Field of Search ........................ 715/788, 526, 715/789, 790, 835, 848

(56) References Cited

U.S. PATENT DOCUMENTS 6,188,405 B1    2/2001   Czerwinski et al. ........ 345/339
6,243,724 B1 *  6/2001   Mander et al. ............. 715/526
6,414,677 B1    7/2002   Robertson et al. .......... 345/419
6,426,761 B1 *  7/2002   Kanevsky et al. .......... 715/788

OTHER PUBLICATIONS

G. Robertson, et al. "Data Mountain: Using Spatial Memory for Document Management" Microsoft Research, 1998, p. 153-162.
J.C. Platt "AutoAlbum: Clustering Digital Photographs Using Probabilistic Model Merging", IEEE, 2000, p. 1-5.

* cited by examiner

Primary Examiner—John Cabeca
Assistant Examiner—Michael Roswell
(74) Attorney, Agent, or Firm—Amin & Turocy, LLP

(57) ABSTRACT

The present invention relates to a user interface, data structure and method to facilitate management and/or access to data, such as by grouping graphical representations of the data in an image space relative to cluster indicators. A given graphical representation for selected data (e.g., a graphical object) can be associated with a corresponding cluster indicator based on its proximity to the cluster indicator. Thus, cluster membership can be changed, in accordance with an aspect of the present invention, by moving graphical objects relative to the cluster indicators.

68 Claims, 26 Drawing Sheets

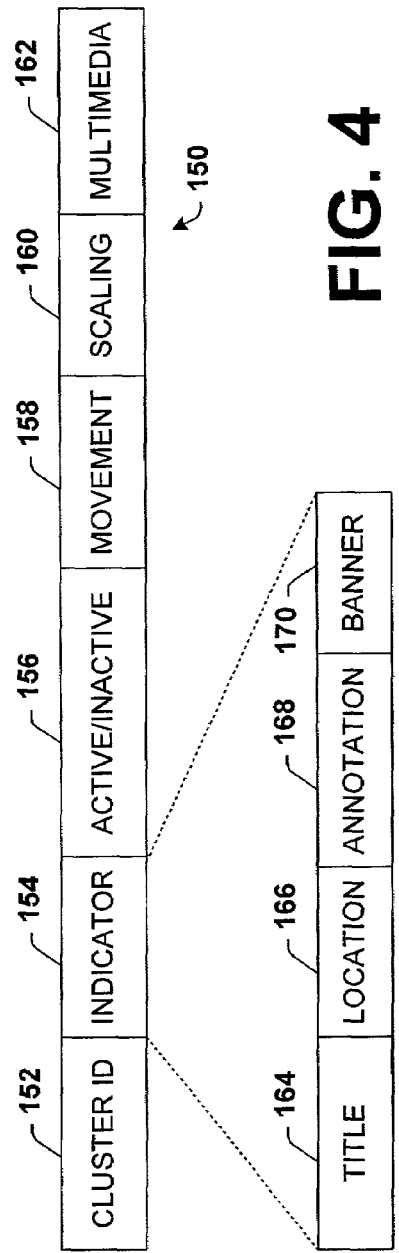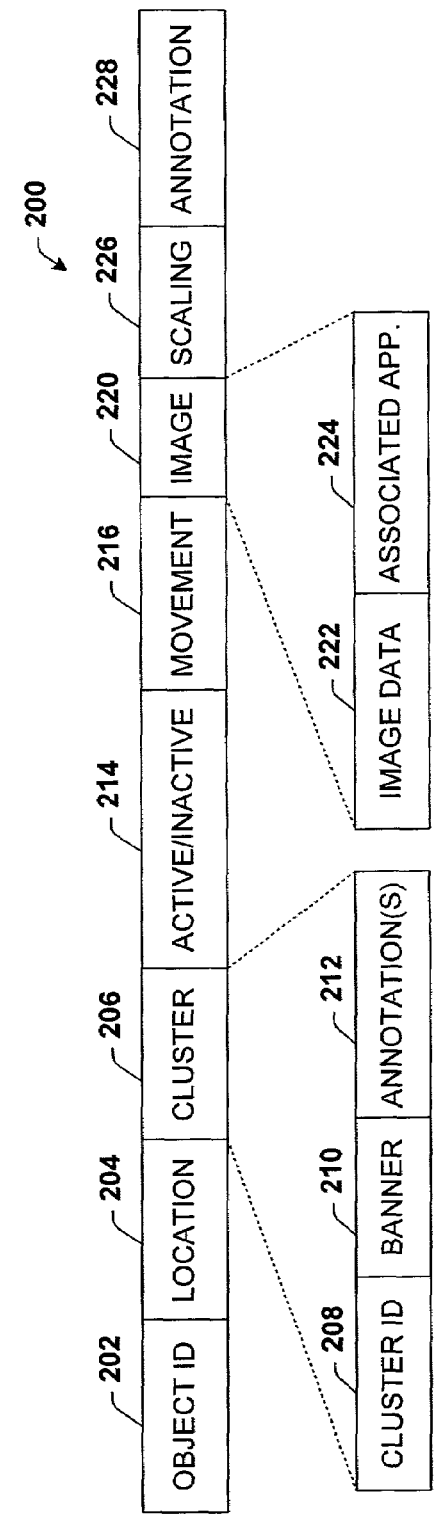

GRAPHICAL USER INTERFACE, DATA STRUCTURE AND ASSOCIATED METHOD FOR CLUSTER-BASED DOCUMENT MANAGEMENT

TECHNICAL FIELD

The present invention relates generally to user interfaces, and more particularly to a graphical user interface, data structure and method to facilitate management of data.

BACKGROUND

Various graphical user interfaces have been developed to provide a rich experience for computer users. Computer programs typically provide a graphical user interface (GUI) to facilitate data entry, to enable viewing output on a display screen, as well as to manipulate or rearrange data. A graphical user interface can be associated with an application program or operating system shell, which may be running on a user's local machine and/or remotely, such as in a distributing computing system or over the Internet.

In view of continuing technological developments and increasing use of the Internet, people are using computers to access information to an ever-increasing extent. Such information can reside locally on the person's computer or within a local network or be global in scope, such as over the Internet. Various approaches have been employed to help users locate and access desired data. In the context of the Internet, for example, some services have organized content based on a hierarchy of categories. A user can thus navigate through a series of hierarchical menus to find content that may be of interest to them. With this hierarchal approach, if a user mistakenly believes that a category will be of interest or include what they were looking for, but the category turns out to be irrelevant, the user must backtrack through one or more hierarchical levels of categories.

Additional complexities arise when a user desires access to multimedia data having a graphical component or image known to the user. This is because most conventional user interfaces employ a hierarchal approach to organizing data and have not been developed to facilitate concurrent viewing of large data sets, such as images associated with multimedia data.

By way of example, one approach is to visualize a large set of graphical images is present such images as thumbnails arranged in two-dimensional list that a user may scroll through. Alternatively, one or more thumbnails can be provided on different pages, such as in a traditional photo album approach. When the images are presented as thumbnails, for example, a user may activate a thumbnail to provide a larger or full size image.

Another approach is to present images as a grid of thumbnails, which may be organized or grouped images together in partitions based on common attributes. Such systems, however, typically are two-dimensional systems that provide little flexibility to the user. As a two-dimensional system, the number of images that can be displayed at a given time is generally limited by the size of the thumbnails and the overall dimensions of the image space on which they are displayed.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to graphical user interfaces, systems and methods to facilitate access to and/or management of data. The data can include graphical data, textual data, audio data, and/or video data.

A graphical user interface (GUI) in accordance with an aspect of the present invention includes an image space, which can be a two-dimensional or three-dimensional image space. One or more cluster indicators are provided in the image space to designate a cluster, which can include any number of objects or be empty (e.g., no associated objects). One or more graphical objects, which are associated with desired data, can be visually associated with a cluster indicator to form a cluster or group. The association between cluster indicators and graphical objects can be based on the proximity of an object relative to the cluster indicators. For example, if a graphical object is moved in the image space of the GUI, the object can become dynamically associated with the cluster indicator to which it is closest. This can correspond to an initial association or to a change in association for the object (e.g., from one cluster indicator to another cluster indicator). In one particular aspect of the present invention, all objects in the image space are associated with a respective cluster indicator.

To further visually differentiate respective clusters, similar graphical features can be shared by the cluster indicator and graphical objects associated with the respective cluster indicator. For example, a color-coding scheme can be utilized so all objects in a given cluster include a uniquely color-coded graphical feature. Alternatively or additionally, other graphical features could be used to help distinguish different clusters. Cluster indicators also can be provided with labels (e.g., text, audio, and/or video) to help distinguish and identify the respective clusters.

In order to accommodate different numbers of clusters and graphical objects in the image space, scaling can be implemented to make efficient use of the image space. For example, where there are numerous graphical objects and/or many clusters of objects, a reduced scaling can be implemented. A reduction scaling can result in proportional scaling of the cluster indicators and graphical objects, which further can be independent of any scaling of the image space or associated surface on which the cluster indicators and graphical objects are arranged. Scaling also can be employed to enlarge the cluster indicators and graphical objects relative to the image space.

To the accomplishment of the foregoing and related ends, certain illustrative aspects of the invention are described herein in connection with the following description and the annexed drawings. These aspects are indicative, however, of a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 4 is an example of a data structure for a cluster object in accordance with an aspect of the present invention.

FIG. 5 is an example of a data structure for a graphical object in accordance with an aspect of the present invention.

DESCRIPTION OF THE INVENTION

The present invention relates to a user interface, data structure and method to facilitate management and/or access to data, such as by grouping graphical representations of the data in an image space relative to cluster indicators. A given graphical representation for selected data (e.g., a graphical object) can be associated with a corresponding cluster indicator based on its proximity to the cluster indicator. Thus, cluster membership can be changed, in accordance with an aspect of the present invention, by moving graphical objects relative to the cluster indicators.

Figure 1:
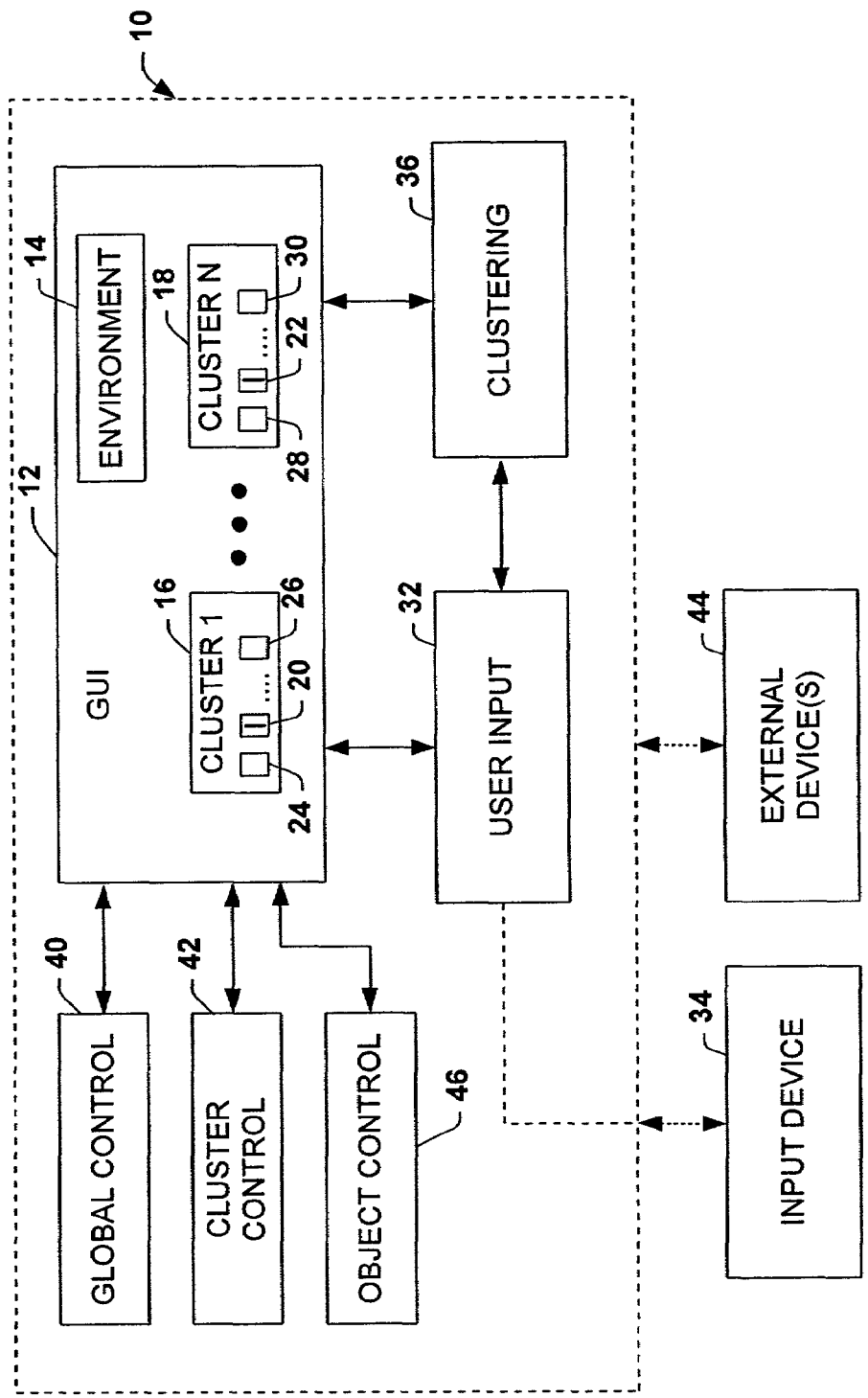
FIG. 1 is a block diagram of a graphical user interface system in accordance with an aspect of the present invention.

FIG. 1 is a block diagram of a system 10 for managing various types of data via a graphical user interface 12 in accordance with an aspect of the present invention. The graphical user interface 12 includes a graphical environment 14, which, in accordance with an aspect of the present invention, provides a graphical representation of a three-dimensional image space. The GUI environment 14 alternatively could be a two-dimensional image space. For example, the environment 14 can be in the form of a surface, such as a plane, a hillside, a mountain or other arrangement of three-dimensional image space. The GUI 12 also includes one or more clusters 16 and 18, indicated as CLUSTER 1 to CLUSTER N, where N is an integer greater than zero. Each cluster 16, 18 includes a respective indicator object 20, 22 that provides a marker to identify the respective cluster. For example, the indicator objects 20 and 22 can include graphical elements displayed in the image space of the GUI 12. The cluster indicators 20 and 22 can include respective annotations (e.g., audio or textual label) that further identify a characteristic or name of the respective clusters 16 and 18.

Each cluster 16, 18 also can include any number of graphical objects 24, 26 and 28, 30. The graphical objects 24, 26, 28 and 30 can be programmatically associated with data, which can include textual data, image data, video data and/or audio data. The objects 24 and 26 are visually associated with the indicator 20 of the cluster 16. Similarly, graphical objects 28 and 30 are visually associated with the cluster indicator 22 of the cluster 18. In accordance with an aspect of the present invention, the visual association between graphical objects 24–30 and corresponding indicator objects 20 and 22 occurs dynamically based on the proximity of the graphical objects and the indicator objects in the image space of the GUI 12. For example, the graphical objects are dynamically associated with any indicator automatically based on the visual distance in the image space 12 between the object and the respective indicators 20 and 22. In one aspect of the present invention, the graphical objects 24–30 are associated with the closest cluster indicator, which association can be implemented automatically during movement of a respective graphical object. It is to be understood and appreciated, however, that a threshold distance can be implemented such that if a graphical object is more than the threshold distance away from any cluster indicator, the object may remain unassociated with any cluster. In addition, it may be desirable to prevent changes in cluster membership where one or more entire clusters are being moved relative to the image space environment 14.

In order to effect desired interactions between clusters 16 and 18, graphical objects 24–30 and cluster indicators 20 and 22, the system 10 employs a user input 32, such as provided by a user input device 34. The user input device 34 can be a pointing device, a keyboard, a touch screen, a touch pad, an audio input, or other input device capable of entering user data into the system. For example, the user input 32 can be provided based on the location of a pointer, cursor or other graphical object that is moveable on a computer screen or display. The pointer appears to move relative to the GUI. The pointer thus can be utilized to select or deselect one or more clusters and, in turn, effect movement of the selected cluster, such as based on the position of the pointer and other input provided with the input device 34. When a cluster 16 or 18 is selected and moved, all objects associated with that cluster move accordingly in the image space 12. Similarly, the user input 32 also can be utilized to select or deselect one or more graphical objects 24, 26, 28 or 30. It is to be appreciated that plural objects can be selected within a single cluster or in multiple clusters.

For example, an object 26 can be moved from the cluster 16 to another cluster 18 by appropriate requests provided by the user input 32. In accordance with an aspect of the present invention, as the object 26 is being moved in the image space of the GUI 12 towards the cluster 18, the object is dynamically visually associated with the other cluster 18. The association can occur in response to determining that the relative distance between the object 26 and the cluster indicator 22 is less than the distance between that object and the cluster indicator 20 of its previously associated cluster 16.

To further facilitate visualization of an association between objects and their corresponding clusters, the objects in each respective cluster can share a common banner. The banner, for example, is a color-coded graphical feature (e.g., a strip or halo) extending along a portion of the graphical object. Thus, each cluster can be assigned a different color code that can be applied to the graphical objects and cluster indicator in each respective cluster. Thus, continuing with the above example, as the object 26 moves from the cluster 16 to the cluster 18, the banner of the graphical object 26 changes to reflect the change in cluster association or membership.

The system 10 also includes a clustering control 36 operative to implement the visual association and membership of graphical objects relative to the clusters 16 and 18. The clustering control can implement an algorithm that determines cluster membership as a function of the relative distance between the respective graphical objects and the cluster indicators. For example, the distance can be a linear two-dimensional distance (e.g. screen) distance between an adjacent portion of the graphical object and a nearest portion of the cluster indicator. Additionally or alternatively, the distance can be a simulated three-dimensional distance, such as for situations where the image space of the GUI 12 is a three-dimensional, graphical representation. In a three-dimensional case, scaling (or mapping) also can be implemented such that the threshold distance used for determining cluster membership is scaled according to the locations of the respective objects.

In order to perform desired operations relative to the image space as a whole, the system 10 can include a global control 40 that can be activated via an appropriate, user input 32 provided relative to image space 12. The global control 40 provides a menu of options that can be utilized, for example, to import additional graphical objects into the image space, to create a new cluster, or to arrange the clusters in a predetermined manner, for example. The global control 40 also may include a scaling function that can be selected to adjust the relative size of the graphical objects and indicators relative to the environment 14. For example, it may be desirable to scale the graphical objects and cluster indicators without any associated scaling of the environment 14. In addition, in situations when the scaling is being applied to accommodate additional graphical objects and clusters in the image space 12 (e.g., a reduction in scaling), it may be desirable to scale the graphical objects 24–30 a greater amount proportional to the relative scaling of the cluster indicators 20 and 22.

A cluster control 42 can be associated with each cluster 16, 18 to perform desired operations relative the respective clusters. The cluster control, for example, provides a pop-up menu of available options, although other formats could be used to display the options (e.g., a tool bar menu). The particular options available with the cluster control 42 can vary depending on the types of data represented by the graphical objects of the respective cluster. Some possible operations include sending the cluster (including all associated objects) to one or more external devices 44. The external devices 44 can be hardware and/or software, such as associated applications that are able to utilize the graphical objects or any of its associated data. For example, where the graphical objects represent images or photographs, the objects or photographs can be sent via the cluster control 42 through an email program, be sent to a screen saver application, or be sent to an electronic picture frame.

An object control 46 also can be employed to perform desired operations relative to the graphical objects 24, 26, 28 and 30. The object control 46, for example, provides a menu of options that can be implemented on the objects. The object control 46 can be activated through the user input 32, such as for a selected object. The object control 46 can enable a user to annotate a selected object, view details of the object, or send the object to an application or to one or more external devices 44. Additionally, general editing can be performed relative to the object via the object menu 46, such as cutting, copying or pasting or deleting. Those skilled in the art will understand and appreciate various other operations that can be performed via similar types of menus relative to a graphical object, all of which are contemplated as falling within the scope of the present invention.

Figure 2:
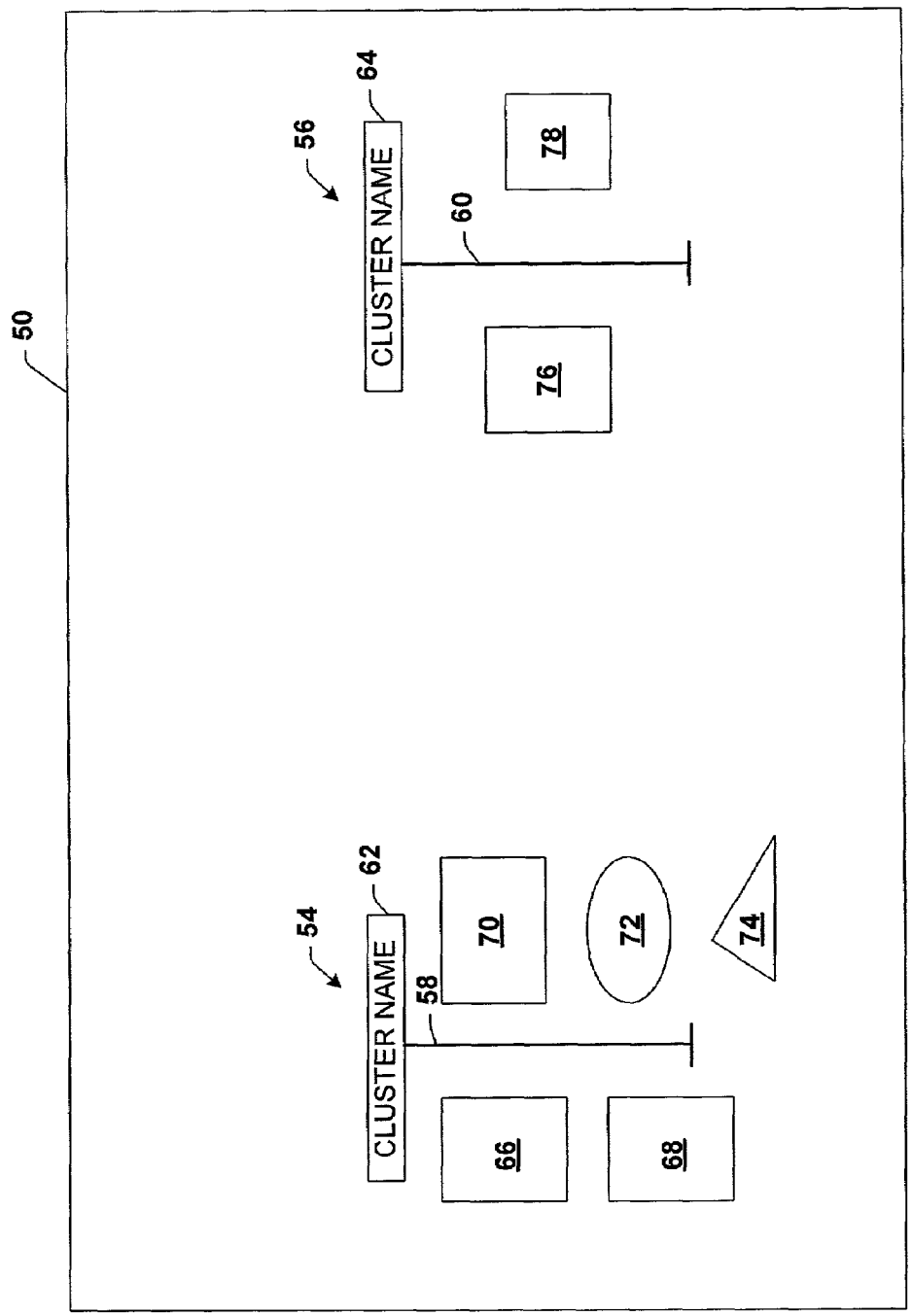
FIG. 2 is a representation of a two-dimensional image graphical user interface in accordance with an aspect of the present invention.

FIG. 2 illustrates an example of a two-dimensional image space representation of a GUI system 50 in accordance with an aspect of the present invention. In this example, two clusters are illustrated, indicated at 54 and 56. Each cluster 54, 56 includes a respective cluster indicator 58, 60. Each of the cluster indicators 58 and 60 includes an associated cluster label 62 and 64, respectively. The labels 62 and 64, for example, provide a name for the cluster and/or other annotations, which can be supplied by the GUI automatically or be programmed by the user. The labels 62 and 64 can include textual, graphical, audio and/or video data.

In the example of FIG. 2, the cluster 54 includes five associated graphical objects 66–74, which objects have been dynamically visually associated with the cluster indicator 58 as a function of the distance between the cluster indicator and the respective objects. The cluster 56 includes two cluster objects 76 and 78, which also have been dynamically visually associated with the cluster indicator 60 due to their proximity relative to the indicator. Various functions may be performed on the clusters 54 and 56 or the respective objects thereof as described herein. Because the example in FIG. 2 is represented in two-dimensional space, the amount of data represented by graphical objects and cluster indicators is generally limited by the size of the image space and the size of the respective objects and cluster indicators.

Figure 3:
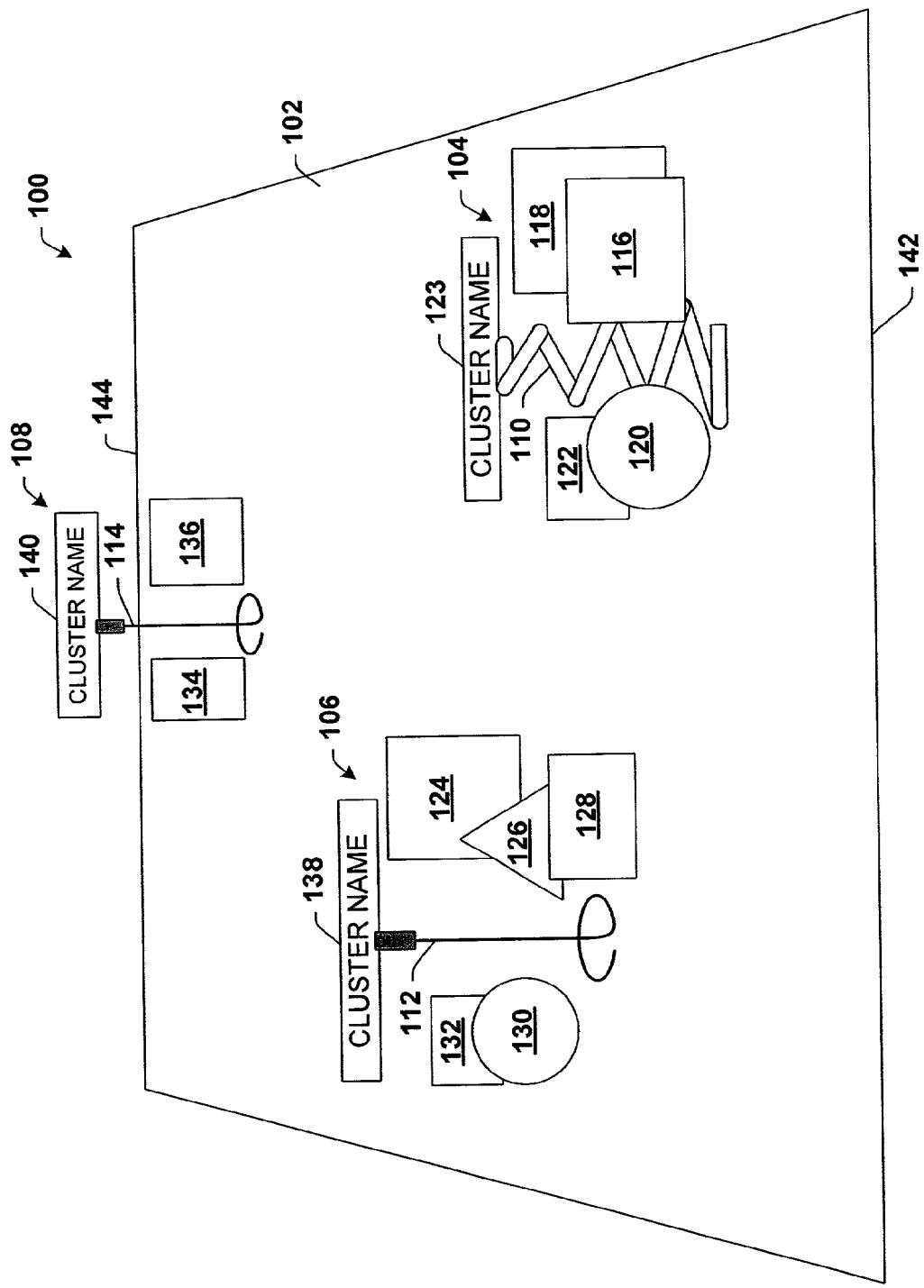
FIG. 3 is a representation of a three-dimensional image graphical user interface in accordance with an aspect of the present invention.

FIG. 3 is an example of a three-dimensional image space that provides a graphical user interface to facilitate access to and retrieval of information in accordance with an aspect of the present invention. The GUI 100 includes a surface 102 on which one or more clusters can be arranged in accordance with an aspect of the present invention. In this example, there are three clusters, 104, 106 and 108 located at different parts of the surface 102. Each cluster 104, 106, 108 includes a cluster indicator 110, 112 and 114 that represent a group of respective objects that form the respective clusters. It is to be appreciated that different types of cluster indicators can be used to help distinguish between the respective clusters, as shown in FIG. 3.

In this example, the cluster 104 has four graphical objects 116, 118, 120 and 122 associated with the cluster indicator 110. The indicator 110 is represented as a three-dimensional helical spring that extends upwardly from the surface 102 to hold a corresponding label 123. The cluster 106 includes five graphical objects 124, 126, 128 and 130 and 132 associated with the cluster indicator 112. The cluster 108 includes two cluster objects 134 and 136 associated with the cluster indicator 114. The cluster indicators 112 and 114 are represented as three-dimensional lengths of rope that extend upwardly from the surface 102 to hold respective cluster labels or name tags 138 and 140. The association between cluster indicators and graphical objects is based on the visual proximity in the three-dimensional space 100 between the graphical objects and associated cluster indicators, such as described herein.

By way of illustration, a new graphical object that is supplied to the image space 100 can be automatically associated with a given cluster that it is closest to upon being imported. Alternatively, a graphical object or objects that are supplied to the image space 100 can be associated with a new cluster that the GUI dynamically creates in conjunction with its importation into the image space.

As shown in FIG. 3, because the image space 100 is a three-dimensional representation associated with a surface 102 clusters near a front portion 142 of the image plane 102 appear larger than clusters located near a rear portion 144. In addition, because the GUI 100 is a three-dimensional representation, graphical objects in a given cluster can be positioned in overlapping relationship to each other, such that portions of the respective graphical objects are occluded. However, advantageously, because the graphical object can display any image associated with the objects, the remaining visible portion of each object should be sufficient to inform a user as to what the image represents.

For example, the respective, graphical objects can be thumbnails of photographs, icons, a cover page of an associated document (e.g., a magazine, book, periodical) or other graphical image that can be used to represent data or a tangible object. By way of further illustration, the graphical objects 116–122 can be thumbnails of artwork associated with musical Compact Discs (CDs), Digital Versatile Discs (DVDs) or other media, while other graphical objects 124–132 can correspond to persons or things (e.g., stars, vehicles, places) associated with different television programs or movies. The respective graphical objects 124–132 thus can provide a mechanism to launch the respective programs or movies, such as on an associated television or other multi-media device capable of presenting the respective shows. Those skilled in the art will understand and appreciate that the graphical objects can represent almost any kind of data or distinctive image.

In order to further visually represent an association between graphical objects and cluster indicators, the respective cluster indicator and associated objects can include a color-coded banner (or halo) visually indicating membership to a particular cluster. For example, the cluster label 123 for the cluster 104 and graphical objects 116–122 can include blue banners while the cluster label of the indicator 112 and graphical objects 124–132 might include red banners. The banner thus provides an additional visual element to help differentiate between clusters. In addition, if a pointer hovers over or within a predetermined distance of a cluster indicator or a graphical object, the cluster (including its member objects) or the object can be highlighted to represent an active state or condition of the selected cluster or object. Those skilled in the art will understand and appreciate various, graphical and/or audio mechanisms that can be employed to implement such selection.

FIG. 4 illustrates an example of a data structure 150 that can be used to store, state and attribute information for a cluster in accordance with an aspect of the present invention. The data structure 150 includes a cluster ID field 152 that can contain unique identifying information for a given cluster in a graphical user interface according to an aspect of the present invention. The cluster ID 152, for example, contains a value that distinguishes the cluster from other clusters in the graphical user interface. The data structure 150 also includes a cluster indicator field that contains information associated with a cluster indicator or marker for the respective cluster.

The data structure 150 also includes other fields that facilitate tracking manipulations and operations being performed relative to the associated cluster. In particular, a given cluster can include an active/inactive field 156 that can be set to a binary condition to indicate whether the respective cluster is active or inactive. For example, an active condition corresponds to a cluster that has been selected so that operations can be performed relative to the cluster. Such operations, for example, can include functionality associated with a context menu for the cluster as described herein. When active, the cluster and its associated objects can be highlighted to indicate the active state. An inactive cluster corresponds to a cluster in its ordinary state in which objects of the cluster and associated cluster indicator are visualized in the image space of the interface.

A movement field 158 provides a value indicating whether the cluster is moving relative to the image space of the GUI or is stationary. The movement information, for example, can include a flag value that is set to indicate whether or not the cluster is moving, as well as a value that provides information about the direction and/or speed at which the cluster is moving. The movement field facilitates control of interactions between clusters.

The data structure 150 also can include a scaling field that identifies the relative scaling of the cluster and objects within the cluster. Such scaling, for example, can be determined as a function of the relative location of the cluster in the image space.

As mentioned above, the indicator field 154 contains information that defines the state of the cluster indicator, which is graphically represented in the image space of the associated graphical user interface. The indicator field 154, for example, contains a title field having a value that identifies the cluster. The title can be supplied automatically when a cluster is created, such as based on metadata associated with the cluster being created, or a user can program it.

The indicator field 154 also includes a location sub-field 166 that identifies the location of the indicator relative to the image space. For example, the location can include a two-dimensional screen location or a location in a simulated three-dimensional image space. The location information at 166 further can be used to determine appropriate scaling information to provide at 160. An annotation field 168 also can be provided to provide textual, graphical, audio and/or video annotations for the associated cluster. The cluster indicator 154 further can include a banner sub-field 170 that identifies banner characteristics of the cluster to help visually distinguish each cluster and its associated objects from other clusters and objects in the image space.

FIG. 5 is an example of an object data structure 200 that can be used to store information to define various characteristics and attributes of a graphical object for use in a graphical user interface in accordance with an aspect of the present invention. The object data structure 200 includes an object ID field 202 that contains a value to help distinguish between objects. By way of example, if the object ID corresponds to a data file, the object ID can include its path in filename. Alternatively, if the object corresponds to a web page (e.g., HTML, DHTML and the like), the object ID field 202 can be a URL for the web page. Alternatively or additionally, a unique identifying value can be created for each object represented in the GUI.

The data structure 200 also includes a location field 204 that identifies a relative location of the object in the image space of the GUI. The location information, for example, can be a two-dimensional screen location, such as the pixels associated with the boundaries of the graphical object and/or a simulated three-dimensional position when the graphical user interface is simulating three-dimensions.

A cluster field 206 contains cluster information indicating which cluster or group of graphical objects the respective object is associated. For example, the cluster field 206 includes a cluster ID 208 that identifies the cluster to which the object is associated (e.g., the ID 152 of FIG. 4) as well as banner information 210 that defines banner characteristics for the object (e.g., corresponding to the banner information 170 of an associated cluster). The cluster field 206 also can include an annotation field 212 so that any cluster-specific annotations of the cluster are provided to (or inherited by) the objects that are members of that cluster. Thus, the cluster-specific annotations 212 can vary commensurate with any changes made to annotations 168 of the associated cluster and/or based on cluster membership of the respective object.

A field 214 provides information indicating whether an object is active or inactive. An object can be activated, for example, such as by a user selecting the respective object with a pointing device. Further, movement of an object relative to the image space is indicated based on information contained in a movement field 216. The movement field can indicate whether or not an object is moving as well as its relative direction in the image space. For example, the movement can be a two-dimensional vector or a three-dimensional vector when movement occurs in a three-dimensional image space.

For example, assume that a graphical object is active and moving, as indicated by the active/inactive and movement fields 214 and 216, and that the object is moved from one location to another location that is closer to a different cluster. The relative proximity to the new cluster causes the object to become associated with the new cluster, which, in turn, results in the cluster field 206 being modified to reflect the change in cluster membership. This determination can be performed by a clustering algorithm as a function of the location field 204 of the object and the location field 166 (FIG. 4) of the respective clusters. The location field 204 is updated during movement of the active and moving object.

An image field 220 contains information corresponding to the image being displayed in the image space of the graphical user interface. For example, the image field 220 contains image data 222, which can contain pixel data from which a relatively low-resolution thumbnail representation of an image can be derived for presentation in the image space. The image, for example, can correspond to a digital representation of a photograph, an icon, and so forth. Further, when the image represents data, a web page, or other program that can use an associated application or program module, the image field further can contain a sub field 224 that provides access to corresponding applications or interface.

For example, the object can correspond to a graphical representation of artwork for a CD cover with the field 224 providing access to the various song titles of the respective CD or DVD and to program modules that may be used to play the CD or DVD. Alternatively, the object can correspond to an image associated with a television program or movie. In this situation, the associated application field 224 can provide access to appropriate viewing equipment, (e.g., through an interface device) and associated program modules to enable desired presentation of the movie or program represented by the object data structure 200. As another example, the graphical object can represent a video game (running locally or remotely) with the associated application field providing a mechanism to activate or launch the respective game. Those skilled in the art will understand and appreciate various other implementations or applications of the image field 220 in accordance with an aspect of the present invention.

A scaling field 226 sets desired scaling characteristics for the object in the image space. The scaling of the object can be implemented by scaling the pixel data in the image data field 222 as a function of the location of the object (e.g., location field 204) and/or the location of the cluster indicator to which the object is associated.

The object data structure further can include an object-specific annotation field 228. The annotations, for example, can include audio, textual information, video information and the like. It may be desirable further to automatically populate certain annotations as an object is added to the image space. Such annotations can be implemented based on metadata associated with the object being imported, such as from where it is being imported, who created it, and other attributes. In addition, annotations can be entered automatically based on operations performed on the object, including exporting the object to an external device or by email as well as manually, such as through a context menu control for the object, as described herein.

Figure 6:
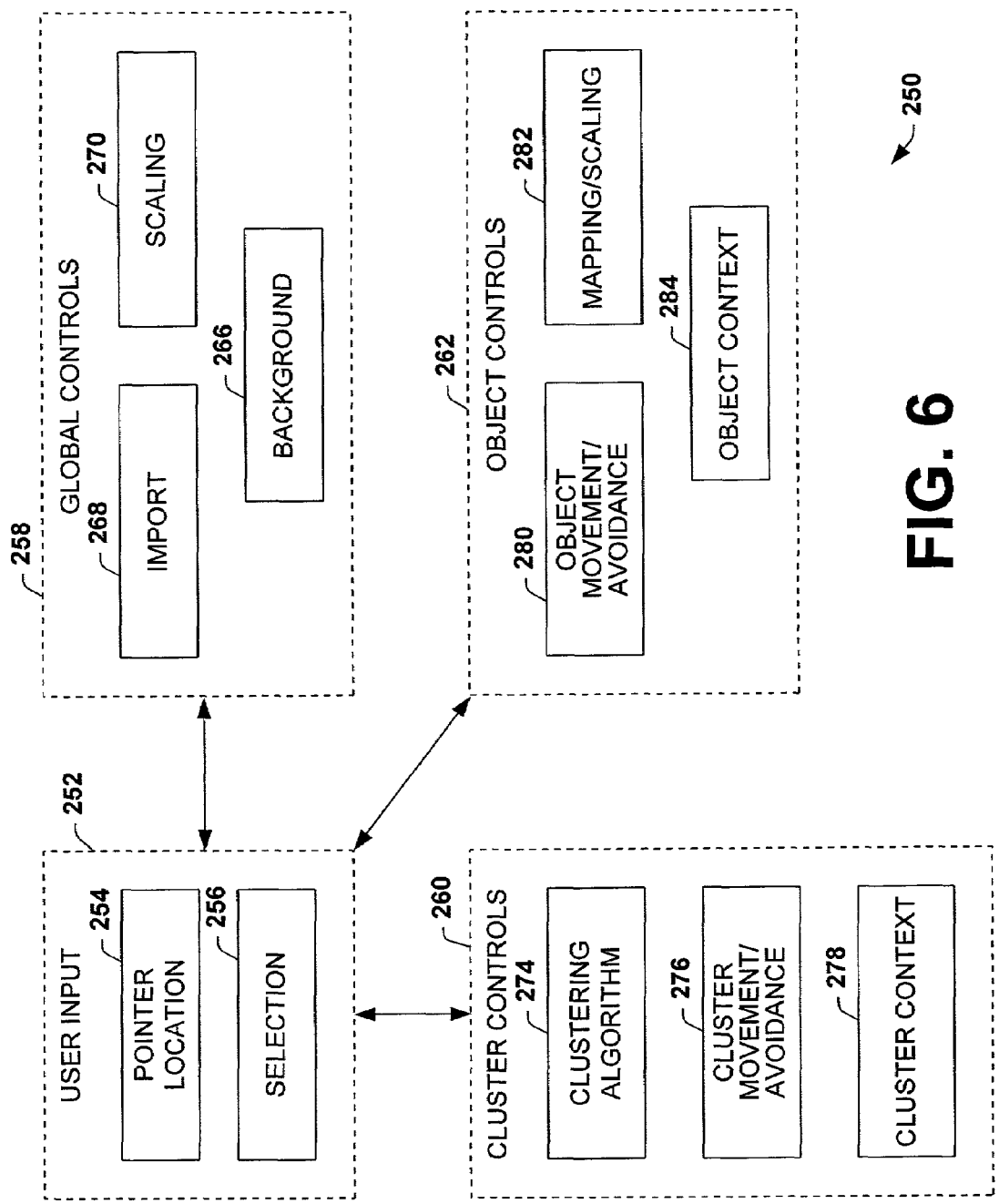
FIG. 6 is a functional block diagram of controls for implementing a graphical user interface system in accordance with an aspect of the present invention.

FIG. 6 is a functional block diagram illustrating examples of various controls that can be implemented in a graphical user interface in accordance with an aspect of the present invention. Most controls are implemented based on user inputs 252, which can include a pointer location component 254 and a selection component 256. The pointer location, for example, can correspond to a two-dimensional screen location of the pointer. In a three-dimensional image space, the pointer location further can correspond to a simulated three-dimensional location in the image space. The selection component 256 provides an indication as to whether a selection has been made with the user input device associated with the pointer, such as in connection with clicking a mouse button or otherwise activating a selection feature of an associated user input device. The user input control 252 is associated with global controls 258, cluster controls 260 and object controls 262.

The global controls 258 are programmed and/or configured to implement controls relative to the background or environment of the image space, indicated at 266. For example, the global controls relative to the background can change the tilt angle or appearance of the background. In addition, the global controls 258 can enable adjustment of viewing options associated with the image space also, such as to switch between a two-dimensional or a three-dimensional representation thereof. The global controls 258 also include import controls 268. The import controls 268, for example, can be employed to import one or more clusters or graphical objects into the image space. Those skilled in the art will understand and appreciate various other types of peripheral devices or applications that can be used in conjunction with the graphical user interface system in accordance with an aspect of the present invention.

The global controls further can include a scaling component 270 that can be utilized to implement scaling globally across the image space. For example, a reduction in scaling can be implemented to accommodate a greater number of clusters and graphical objects in a desired image space. Further, the scaling component 270 can be used to enlarge clusters and graphical objects relative to the background or environment. In accordance with an aspect of the present invention, such scaling can operate on clusters and objects independently of the environment or surface on which such objects are visually displayed. Further it is to be appreciated that different amounts of scaling can be utilized for cluster indicators than for the objects associated with the respective indicators (e.g., different proportional changes to scaling information in fields 160 and 226 of FIGS. 4 and 5, respectively). In this way, information about a cluster can be maintained slightly larger to facilitate locating the various clusters in the image space.

The cluster controls 260 include a clustering algorithm 274 that is applied to implement clustering of objects relative to cluster indicators in accordance with an aspect of the present invention. The clustering algorithm 274 is operative to determine an appropriate cluster to which an object is to be associated based on a relative location or proximity between the object and the respective cluster indicators. For example, such a determination can be made based on location information associated with the respective cluster indicators and a selected graphical object (e.g., data fields 166 and 204 of FIGS. 4 and 5, respectively), such as when the object is moving or when supplied to the image space. The clustering algorithm 274 can be programmed to automatically associate each object with an appropriate cluster based on the distance of determination. Alternatively or additionally, a threshold distance may be utilized, wherein a given object must be within the threshold distance of a respective cluster indicator in order to be associated with that respective cluster. The clustering algorithm 274 further can be operative to automatically arrange graphical objects in a respective cluster so as to maximize utilization of the image space. Further, in a three-dimensional space, the clustering algorithm can arrange graphical objects in a respective cluster so as to partially occlude other objects, but still provide sufficient visual information to distinguish the graphical objects from each other.

A cluster movement/avoidance component 276 is operative to control movement of a selected cluster in the image space and interactions between clusters in accordance with an aspect of the present invention. For example, it may be desirable for a selected cluster that is being moved to push other clusters when within a predetermined distance of the other cluster. The predetermined distance can be a two-dimensional distance on the screen or a simulated three-dimensional distance according to the simulated three-dimensional image space. Such an avoidance technique helps prevent occlusion of the objects in the respective clusters as a given cluster (or group of clusters) is being moved in the image space. In addition, after a cluster has been pushed or moved from its original location, such as in response to being bumped or pushed by a selected cluster, the cluster may rebound back to its original pre-push position after the selected cluster has been moved sufficiently away from the pre-push position. The rebounding can be performed so that the cluster returns back to its original position or it can rebound to an alternative location in the image space based on the available locations and the relative size of the particular cluster. Those skilled in the art will understand and appreciate various modes of animation that can be utilized to provide a pleasing transition during the rebound condition.

The cluster controls 260 further include a cluster context component 278, which provides a menu of available operations that may be performed relative to a selected cluster or group of clusters. The cluster context 278, for example, displays a pop-up menu of available options, which can include other associated pop-up or drop down menus. Some possible menu options include sending the selected cluster (including all associated objects, e.g., image data, textual data, audio data, video data, associated applications) to a desired destination. The destination can include hardware and/or software, which may reside on be coupled to the computer or other device running the GUI. Alternatively, the destination can be a remote destination, such as an email recipient, a Web page, or other device. The options also can include performing editing of cluster annotations as well as viewing images as part of show, which can include annotations. Based on the description herein, those skilled in the art will understand and appreciate other possible operations that can be performed on a cluster in accordance with an aspect of the present invention.

The object controls 262 include an object movement/avoidance component 280 that is operative to control movement of an object relative to the image space, such as based on user input information provided at 252. The object movement control 280 further can implement occlusion avoidance during movement of the selected object. For example, a selected graphical object can be maintained in the foreground and display the selected (or active) object in a highlighted condition to visually distinguish it from other objects as it is moved in the image space.

The object controls 262 also can include a mapping/scaling component 282 that is operative to implement desired 2D and 3D mapping and scaling of the respective objects. Such mapping and scaling can be implemented based on the object location of the object and the global scaling implemented at 272. The mapping and scaling also can vary depending on whether the image space corresponds to a two-dimensional or three-dimensional representation.

The object controls 262 further include an object context control component 284 that is operative to implement various menu options relative to a selected object. The object context 284 can be activated based on user inputs provided at 252. The object control 46 can enable a user to annotate a selected object, view details of the object, or send the object to an application or to one or more external devices 44. Additionally, general editing can be performed relative to the object via the object menu 46, such as duplicating, cutting, copying, pasting or deleting a selected object. A selected object also can be sent to a desired destination, such as described with respect to the cluster context 278. Those skilled in the art will understand and appreciate various other operations that can be performed via similar types of menus relative to a graphical object, all of which are contemplated as falling within the scope of the present invention.

Figure 7:
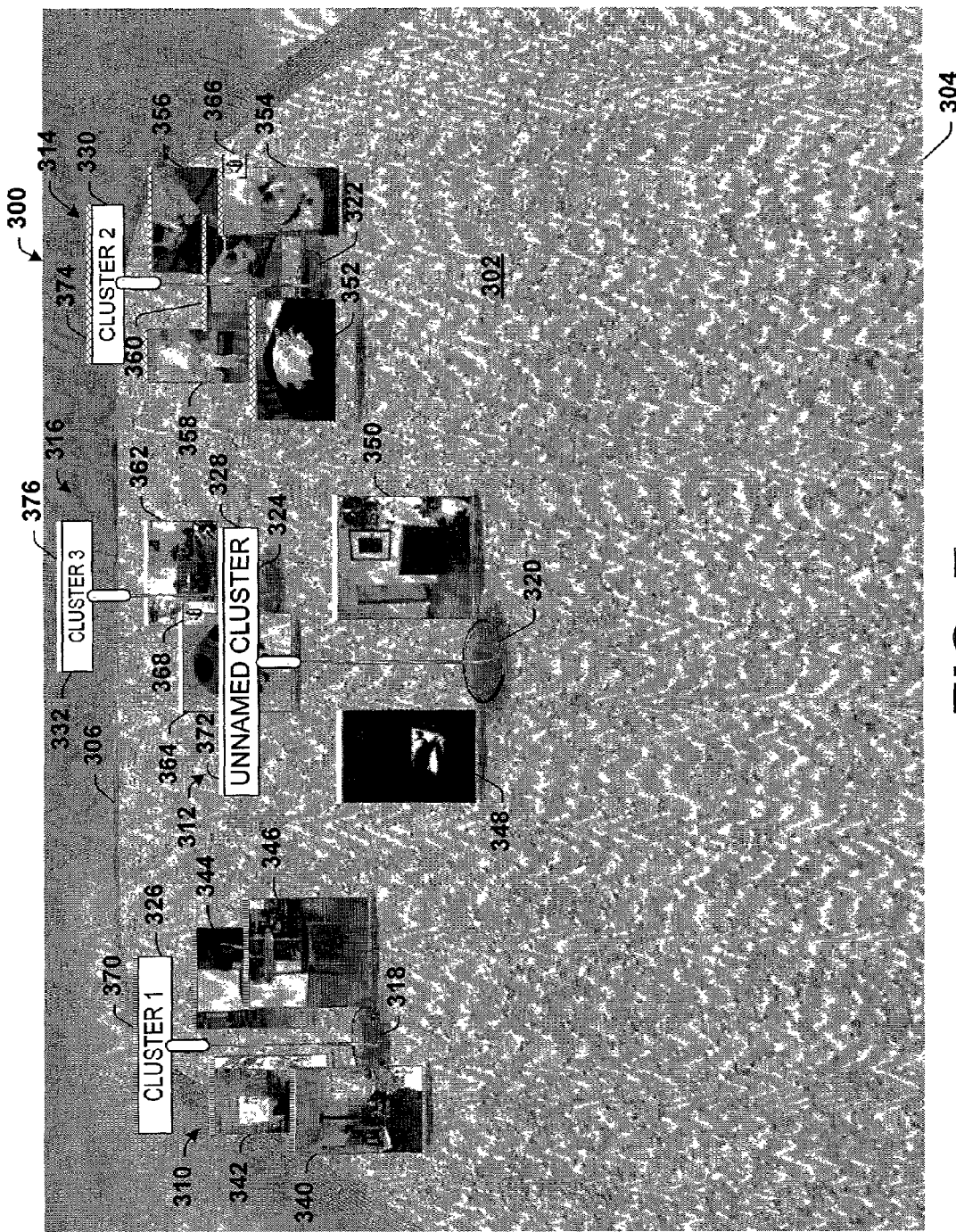
FIG. 7 is an example of a display of a basic three-dimensional GUI implemented in accordance with an aspect of the present invention.

FIG. 7 is an example of a basic display for a GUI 300 that can be implemented in accordance with an aspect of the present invention. In this example, the GUI 300 includes a graphical representation of a three-dimensional surface 302. The surface 302 includes a front portion 304 near the bottom of the figure and a rear portion 306 simulated as extending into the display, which is located near the top of the figure. The surface 302 provides a background or environment for displaying one or more clusters in a three-dimensional environment.

The GUI 300 also includes a plurality of clusters 310, 312, 314 and 316 distributed across the surface 302. Each cluster 310–316 includes a respective cluster indicator 318, 320, 322, 324 that provides a focal point to facilitate grouping of objects within the respective clusters. The cluster indicators 318–324 further define the location of the clusters 310–316 relative to the surface 302. The location can be a two-dimensional screen location or it can be a simulated three-dimensional position.

In the example of FIG. 7, the cluster indicators 318–324 are depicted as wire (or rope) stands, which are arranged with a generally circular base and an elongated portion that extends upwardly from the surface 302. The stands of the indicators 318, 320, 322 and 324 hold respective labels (or name tags) 326, 328, 330 and 332 at their upper ends. The labels 326–332 are annotated with text (e.g., name tags) to identify the corresponding clusters. The annotations could be created (e.g., automatically) when the clusters are created, such as based on metadata associated with the data from which the cluster is formed. Alternatively, or additionally, a user can edit or create the labels programmatically, such as by employing a cluster context menu, as described herein. It is to be understood and appreciated that any type or configurations of markers could be implemented as cluster indicators in accordance with an aspect of the present invention. Further a cluster indicator could be generated based on a similar feature (e.g., corresponding to a common person, place or thing) associated with the graphical objects in given cluster.

Each cluster 310–316 can include one or more graphical objects, which are visually associated with the respective clusters based on the distance or visual proximity between the objects and the cluster indicators of the respective clusters. In the example of FIG. 7, the graphical objects are depicted as two-dimensional photographs, although it is to be understood and appreciated that any type of two-or three-dimensional object can be utilized as a graphical object in accordance with an aspect of the present invention. The cluster 310 includes four graphical objects 340, 342, 344 and 346 disposed generally about the cluster indicator 318. Objects 348 and 350 of the cluster 312 are located on opposite sides of the indicator 320. The cluster 314 includes five associated objects 352, 354, 356, 258 and 360 and the cluster 316 includes two graphical objects 362 and 364. As mentioned herein, a cluster can have any number of associated graphical objects, including an empty cluster (having no objects).

As shown in FIG. 7, the objects 354 and 364 include associated audio annotations, as indicated by the audio indicators (e.g., graphical representations of speaker) 366 and 368, respectively, attached to the respective objects. For example, a user can activate the associated audio by moving a pointing device or cursor onto the desired audio indicator 366 or 368 and selecting (e.g., by clicking with a pointing device) or by activating a corresponding context menu option for the respective object. Such audio can be created as an annotation or otherwise associated with the object via the GUI 300 when provided to the image space, such as during an importation process, as described herein. As described below, other types of annotations, including textual and/or graphical, also can be associated with graphical objects by a user.

In addition to the labels 326–332, the objects are arranged near respective cluster indicators to visually distinguish between objects associated with one cluster and objects associated with another cluster. Further the cluster indicators 318–324 can include banners 370, 372, 374 and 376, such as extending along one or more sides of their respective labels 326, 328, 330 and 332. The banners 370–376 can be color- or gray-scale-coded to provide another distinguishing characteristic for the clusters 310–316. For example, the banner 370 is red, the banner 372 is violet, the banner 374 is orange and the banner 376 is white, as depicted by corresponding stippling in FIG. 7. In accordance with an aspect of the present invention, the banner attributes of the cluster indicators are applied to corresponding banners of the graphical objects 342–364 to visually represent their association with corresponding clusters, as shown in FIG. 7. Thus, if an object were moved and, in turn, associated with a different cluster, its respective banner would be modified to match the banner attributes of the new cluster (see, e.g., FIG. 15). Those skilled in the art will understand that other colors and/or various textured patterns can be used to further emphasize groupings of objects and to distinguish different clusters from each other. For example, color-coding and/or textures also could be integrated into the labels 326–332 or into other parts of the cluster indicators 318–324.

In view of the basic GUI system 300 described above with respect to FIG. 7, examples of different functions and features that can be implemented in accordance with various aspects of the present invention are illustrated in FIGS. 8–21. The examples are described in the context of the basic GUI 300 in which similar reference numbers are used to denote corresponding parts previously described with respect to FIG. 7. Those skilled in the art will understand and appreciate other arrangements and GUIs that also could be implemented according to the present invention.

Figure 8:
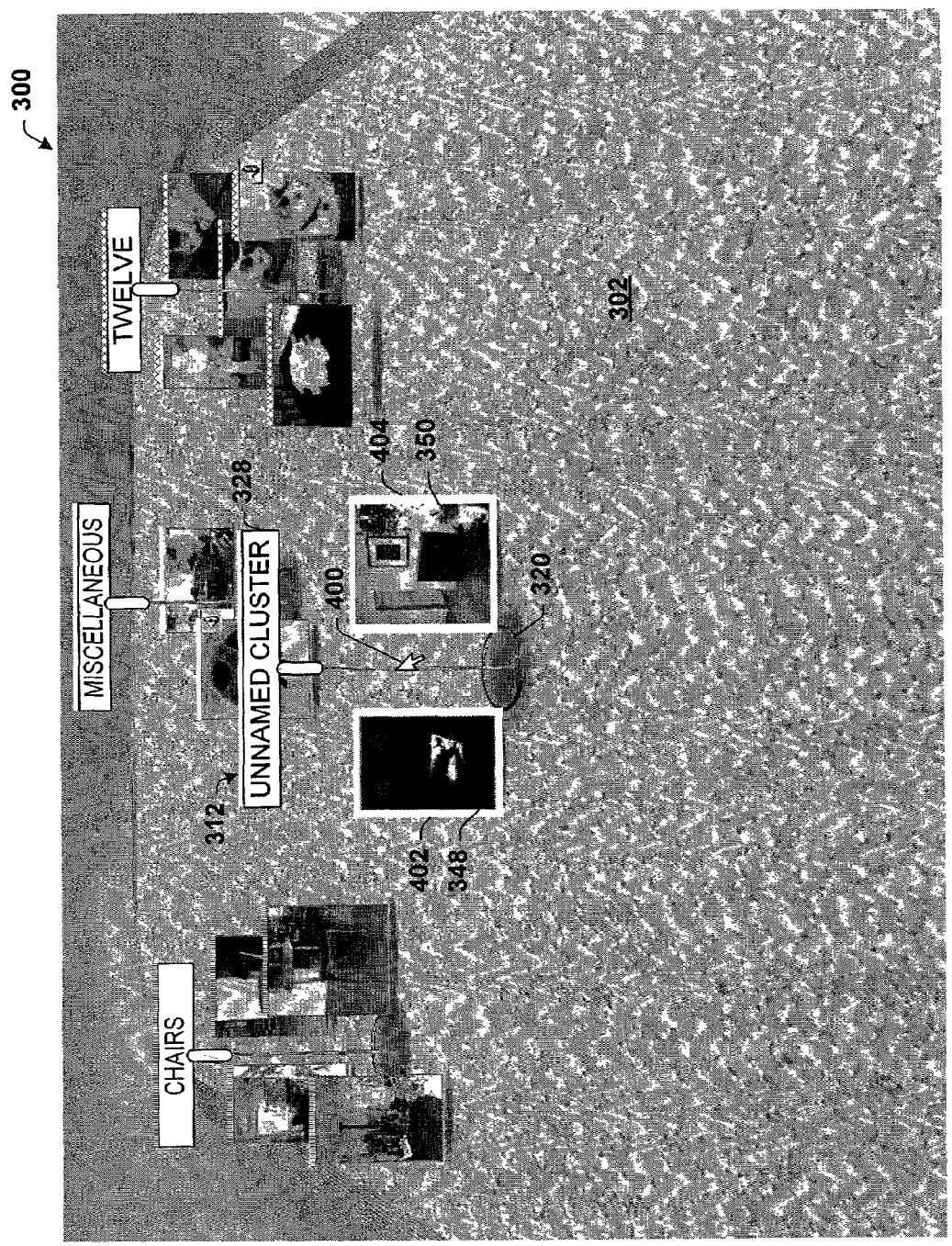
FIG. 8 is an example of a display of a three-dimensional GUI, illustrating a highlighted cluster in accordance with an aspect of the present invention.

Turning to FIG. 8, a user can interact with the GUI 300 using a pointing device, such as a mouse, touch pad, touch screen monitor, or the like. The pointing device is associated with a pointer or cursor 400, which the user can move relative to the GUI 300. For example, user inputs can be processed and passed to a pointer location determination process, which is operative to determine a pointer location based on the inputs. The determined location is used to graphically represent the pointer 400 on the image space of the GUI 300, as well as corresponding movement thereof in response to the user inputs. The location of the pointer 400 can be a two-dimensional screen location or be mapped into a simulated three-dimensional space represented by the GUI 300. The location of the pointer 400 further can be compared relative to the location of clusters and objects to enable functions and features to be implemented in accordance with an aspect of the present invention.

In the example, of FIG. 8, the pointer 400 has been employed to select the cluster 312. The selection can be made, for example, by positioning the pointer and clicking on or near the cluster indicator 320. The selection of the cluster 312 results in the objects 348 and 350 associated with the cluster being highlighted, as represented by bright borders or halos 402 and 404 along one or more sides of the respective objects. The highlighting can signify to a user that various functions can be performed relative to the selected cluster 312, including its associated objects 348 and 350. Also shown in FIG. 8 (and in the remaining FIGS. 9–21), the labels 326, 330 and 332 have been changed respectively to "CHAIRS", "TWELVE" AND "MISCELLANEOUS".

Figure 9:
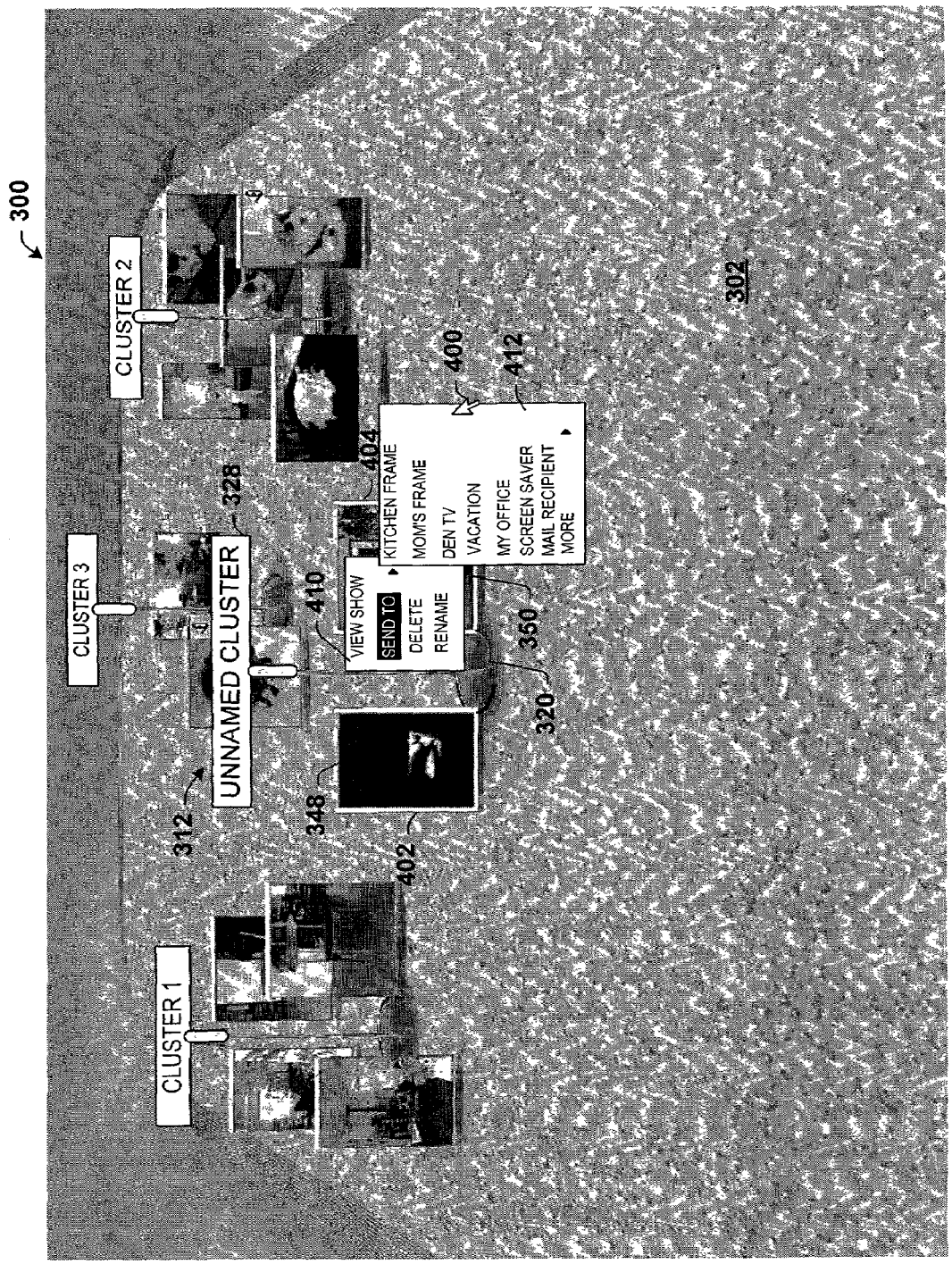
FIG. 9 is an example of a display of a three-dimensional GUI, illustrating a cluster menu in accordance with an aspect of the present invention.

FIG. 9 illustrates an example of the GUI 300 in which a cluster context menu 410 has been activated for the cluster 312 selected in FIG. 8. The cluster context menu 410, which can be a pop-up menu, includes selectable menu options that can be activated by the pointer 400 to perform corresponding operations relative to the cluster 312. In this example, the available menu options include VIEW SHOW, SEND TO, DELETE, and RENAME. Those skilled in the art will understand and appreciate other possible operations and corresponding interface operations that could be used in conjunction with a cluster according to an aspect of the present invention. The VIEW SHOW option can activate a slide show of the images represented by the graphical objects or otherwise present a program. The options can activate an associated dialog component, application, or result in an additional pop-up menu being displayed on the GUI 300.

In the particular example depicted in FIG. 9, the SEND TO option has been selected, resulting in an additional menu 412 that provides a list of possible destinations to where the selected cluster 312 could be sent. The destinations can be hardware and/or software associated with the machine on which the GUI is running or a remote device or application. The SEND TO option, for example, can be used to export the objects 348 and 350 in the cluster 312 to an external device, to send the data to a desired application, to post the objects to a Web page, or to send the objects to one or more mail recipients via email. The exporting can be implemented over a local network (e.g., a home-based network or other LAN), the Internet, as well as to a device directly via a communications link, which can be wired or wireless.

By way of illustration, the menu 412 includes menu options to send the cluster 312 to different user-defined electronic picture frames (e.g., the KITCHEN FRAME, MOM'S FRAME) as well as to a television (e.g., the DEN TV). The VACATION menu option can correspond to a Web page, another electronic picture frame, or other user-defined destination. Another menu option (e.g., MY OFFICE) can be employed to send the objects 348 and 350 to a person's office computer (e.g., via email) or to an office picture frame. The menu 412 also provides an option to send the objects 348 and 350 to an associated SCREEN SAVER application, which can present the graphical images in a known manner. Additional functionality and possible destinations can be accessed by selecting a MORE menu option with the pointer 400.

Figure 10:
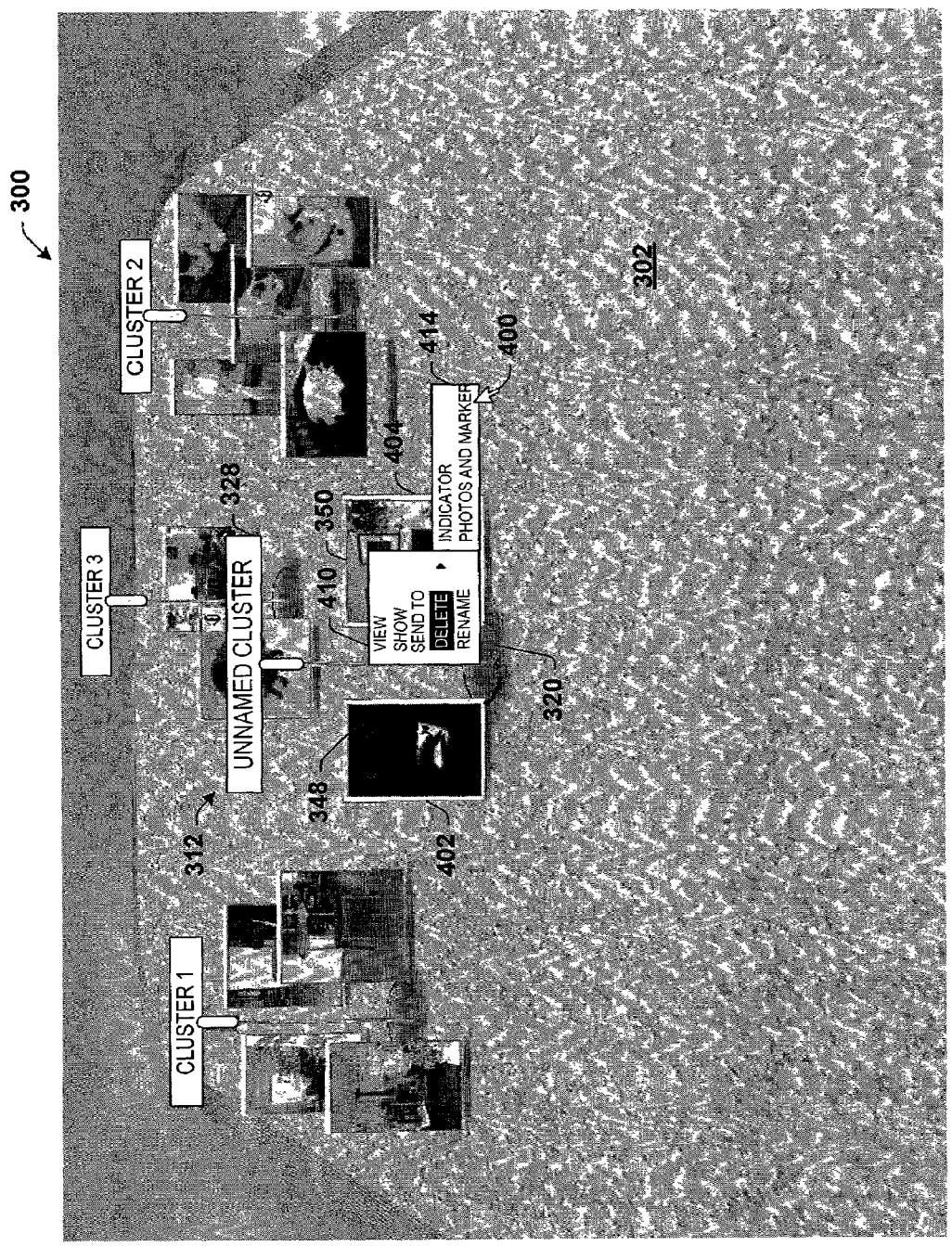
FIG. 10 is an example of a display of a three-dimensional GUI, illustrating another cluster menu in accordance with an aspect of the present invention.

In FIG. 10, the delete option of the cluster context menu 410 has been selected, which provides a corresponding menu 414 for options associated with the delete function. The delete function can be selected if a user desires to delete an entire cluster, including graphical objects, or the cluster indicator. For example, the menu 414 provides an option to delete the cluster indicator (or marker) 320 and an option to delete the indicator and photos, namely, the graphical objects 348 and 350.

Figure 11:
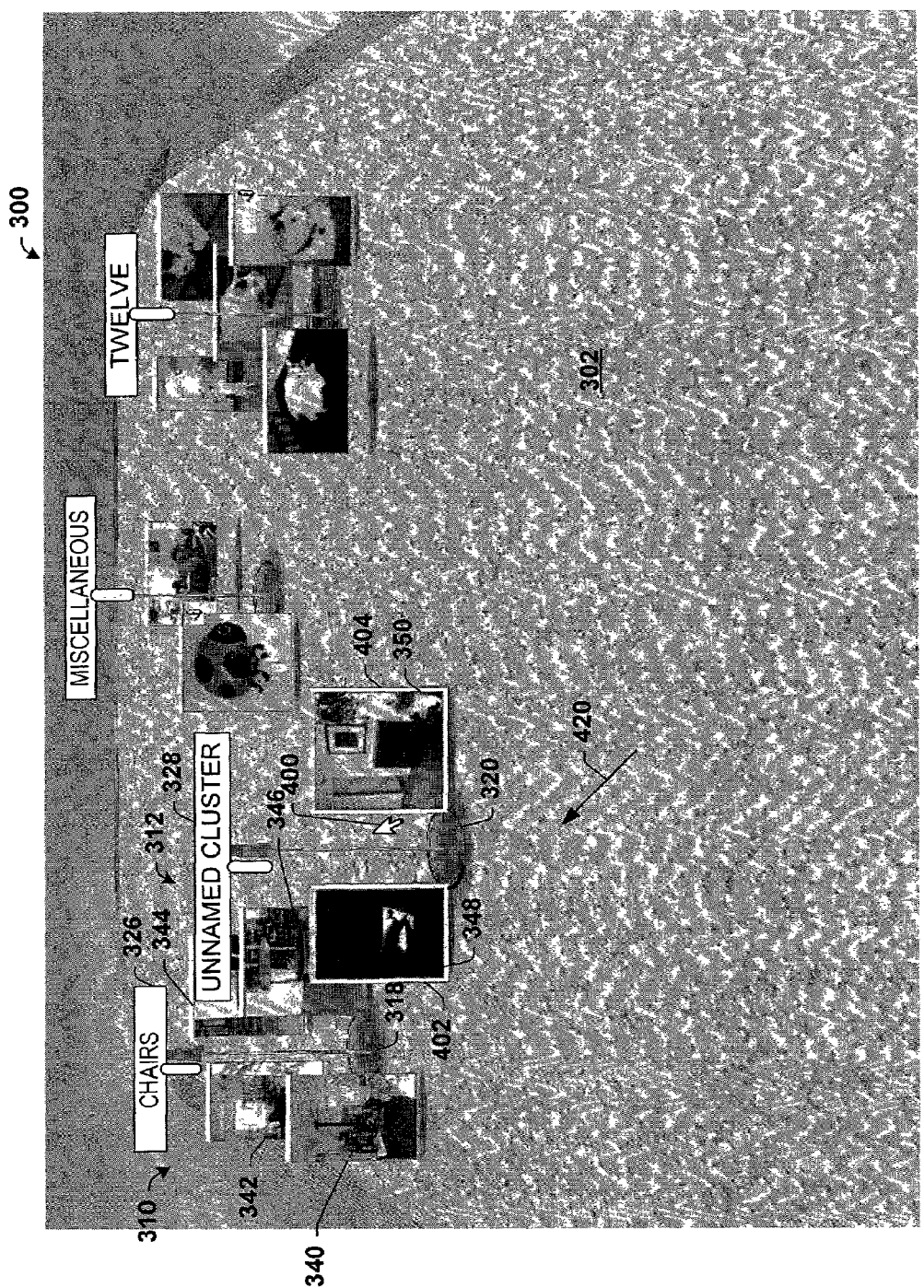
FIG. 11 is an example of a display of a three-dimensional GUI, illustrating cluster movement in accordance with an aspect of the present invention.

FIG. 11 illustrates an example in which the selected cluster 312 is moved in the direction indicated by arrow 420. Movement of the cluster 312 can be established by highlighting the cluster with the pointer 400, as shown and described in FIG. 8, and in turn, dragging the highlighted cluster via the pointer in the direction 420. During such movement, it is to be appreciated that scaling can be implemented based on the simulated three-dimensional position of the cluster 312 that is being moved relative to the surface 302. In addition, it is noted that during movement of the cluster 312, the objects 348 and 350 can remain in a generally fixed position relative to the cluster indicator 320. Further, as the cluster 312 is moved in front of portions of the cluster 310, including the objects 344 and 346, the cluster labeled 328 and the object 348 may occlude portions of the cluster 310.

Figure 12:
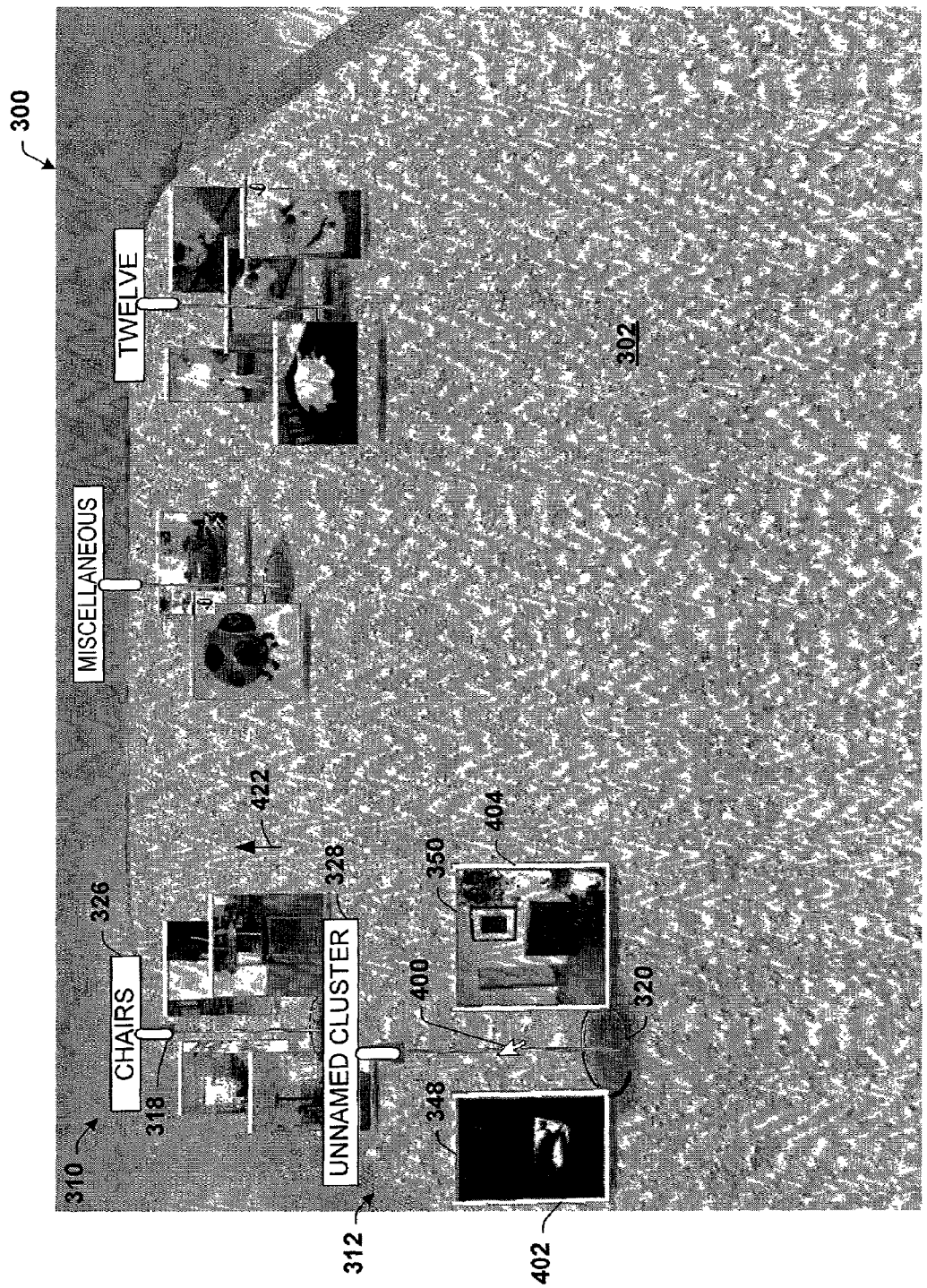
FIG. 12 is an example of a display of a three-dimensional GUI, illustrating cluster avoidance in accordance with an aspect of the present invention.

FIG. 12 illustrates an example of the GUI 300 based on movement of the cluster 312 into the cluster 310. In particular, as the cluster 312 is moved into engagement or within a predetermined distance of the cluster 310, the cluster 310 can be moved in the direction of the arrow 422 in order to avoid interaction with the cluster 312. That is, the highlighted active cluster 312 is operative to push other clusters, such as when the cluster being moved is within a predetermined distance (e.g., less than a distance threshold) of another cluster. The distance between clusters can be determined as a two-dimensional distance on the screen or based on a three-dimensional distance determination using the simulated three-dimensional distance displayed in the GUI 300. When the cluster 310 is pushed, it can remain in the position to which it is pushed, as shown in FIG. 12, alternatively, after a cluster is pushed, it can rebound back toward its original position, partially or fully depending upon the final position of the moving cluster and the available space on the GUI surface 302. Additionally or alternatively, both the cluster being moved and the cluster being pushed both can rebound partially to provide different levels of interaction or interaction styles. The determination as to whether the distance threshold has been met can be based upon the closest objects in the clusters 310 and 312 or based on the distance between the respective cluster indicators 318 and 320.

Figure 13:
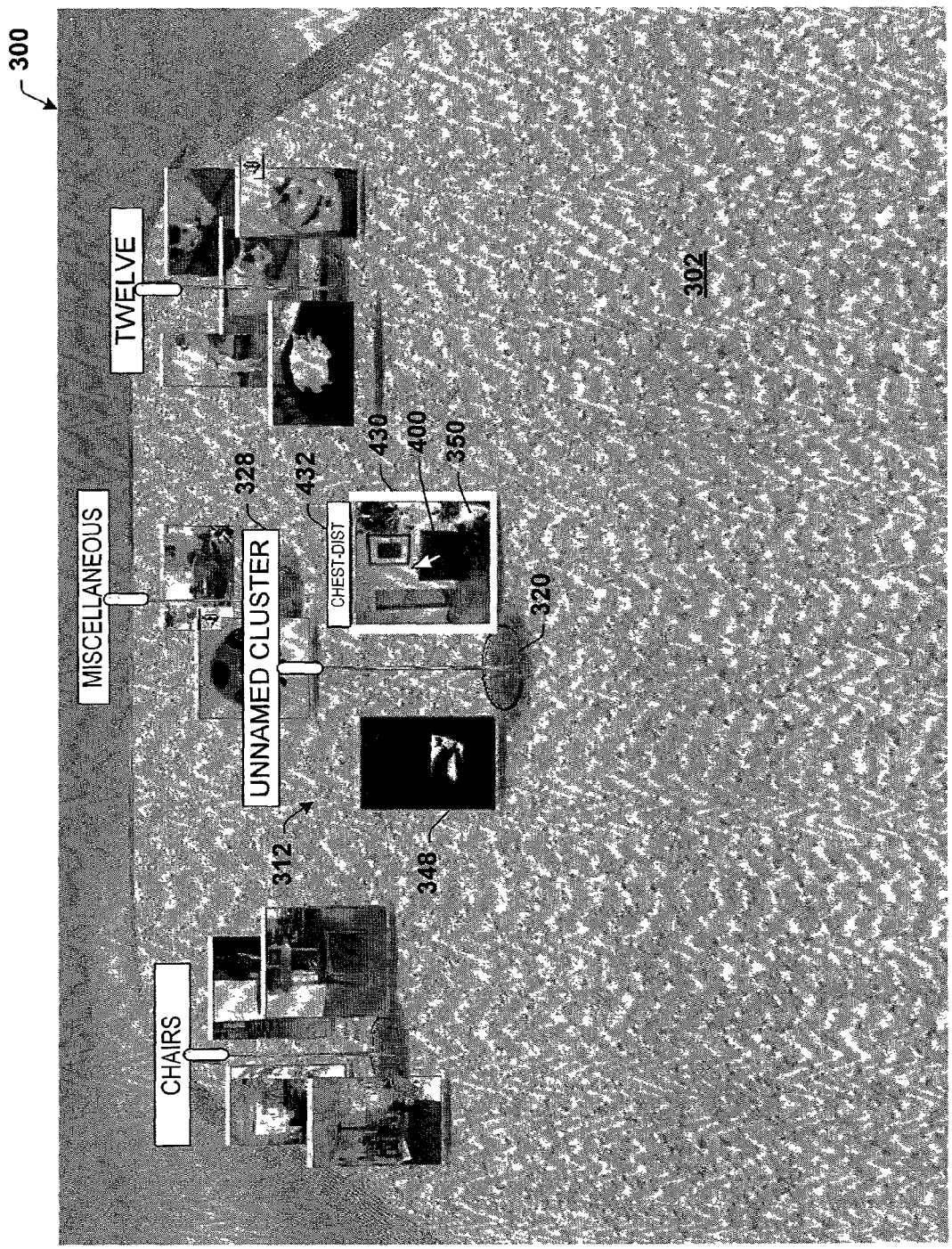
FIG. 13 is an example of a display of a three-dimensional GUI, illustrating a highlighted object in accordance with an aspect of the present invention.

As shown in FIG. 13, the pointer 400 also can be utilized to select an object 350 in accordance with an aspect of the present invention. When the pointer 400 either overlaps or is within a predetermined distance of the object 350, the object can be highlighted by a border (or halo effect) 430 along one or more sides of the object. The highlighted border 430 indicates an active state of the object 350. In addition or alternatively to the border, the contrast or brightness of the graphical object 350 can be modified to further distinguish it from other objects in the cluster and in the image space of the GUI 300. As mentioned herein, an object can include an annotation that can become visible when the object 350 is active, as indicated at 432.

Figure 14:
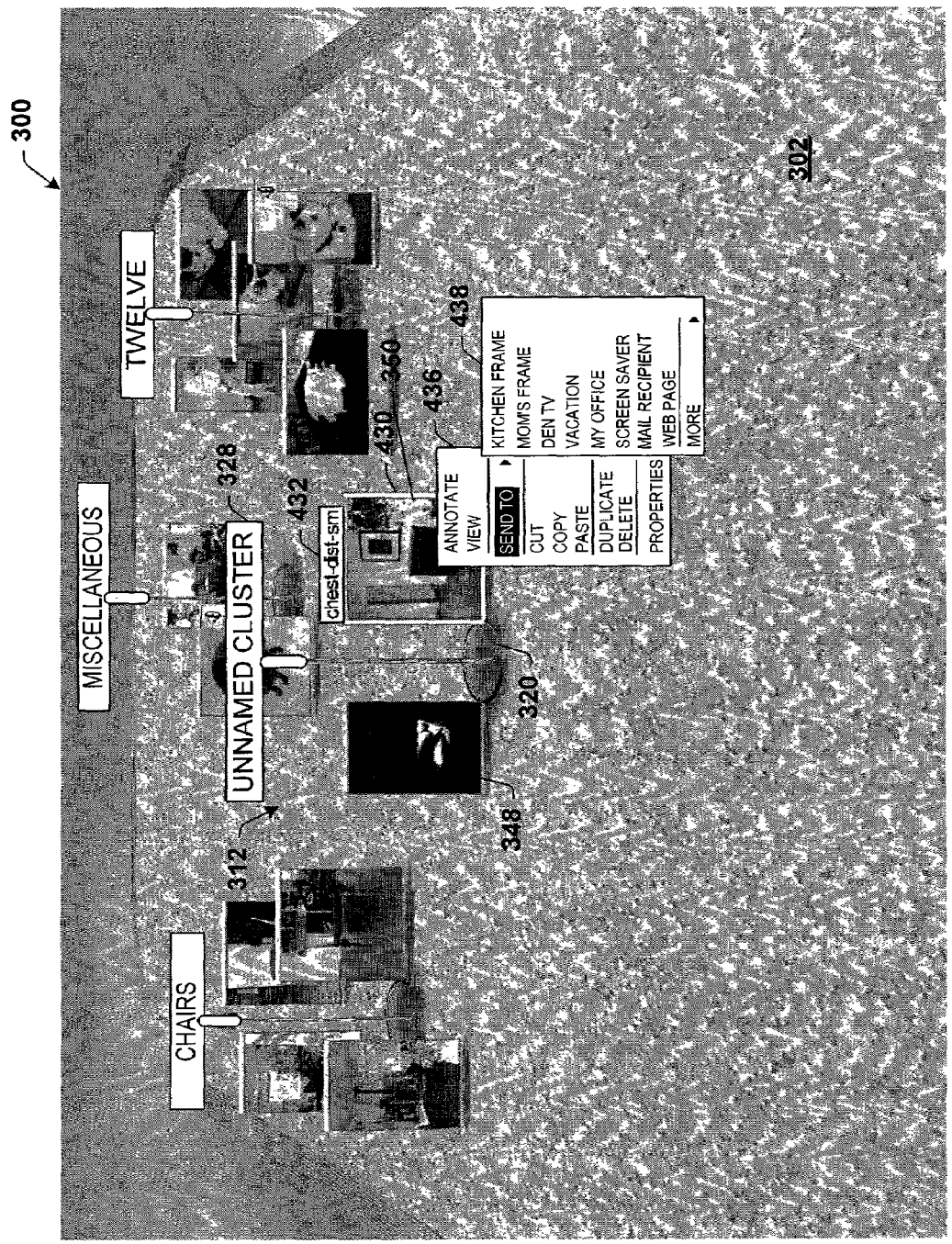
FIG. 14 is an example of a display of a three-dimensional GUI, illustrating an object menu in accordance with an aspect of the present invention.
Figure 15:
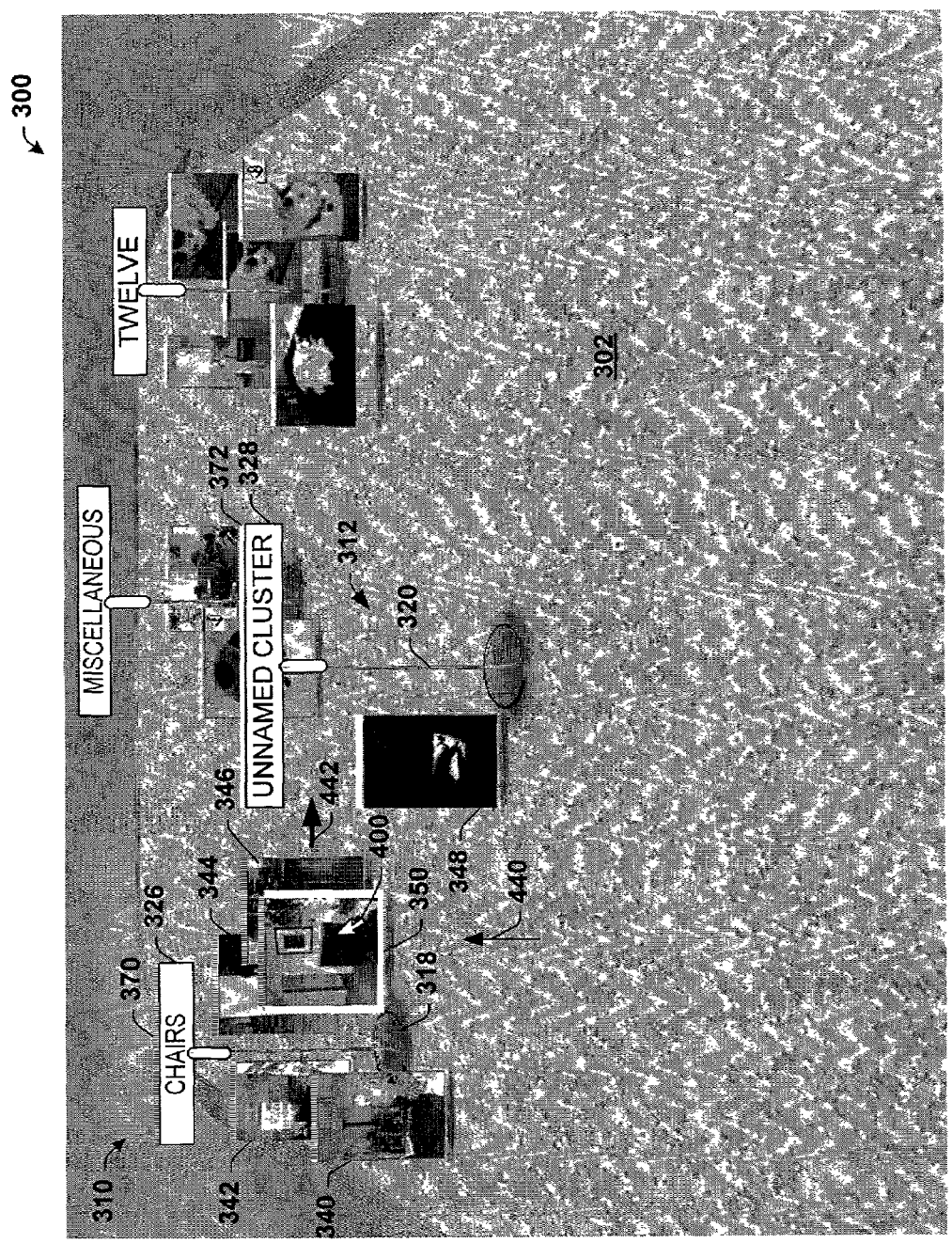
FIG. 15 is an example of a display of a three-dimensional GUI, illustrating object movement and avoidance in accordance with an aspect of the present invention.
Figure 16:
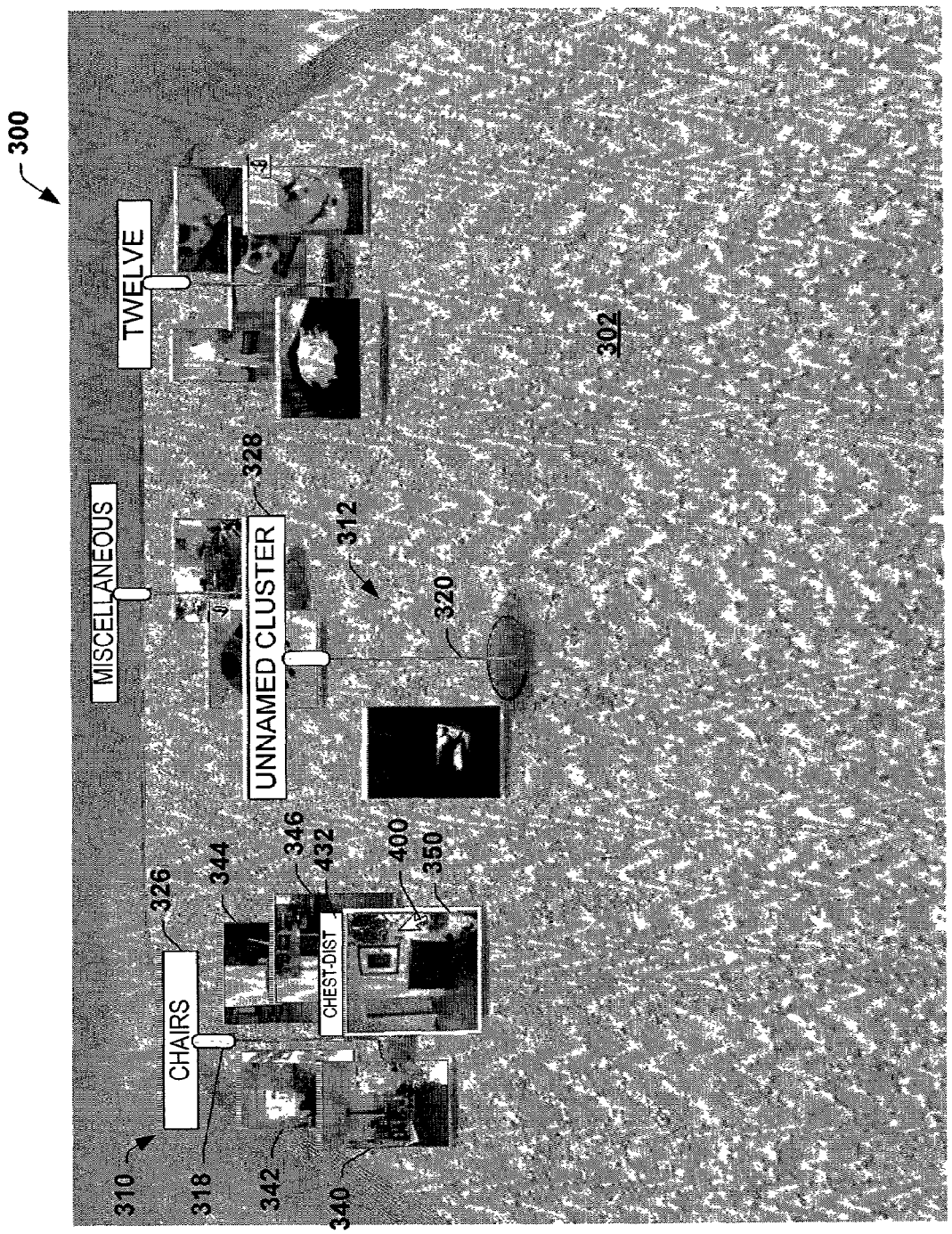
FIG. 16 is an example of a display of a three-dimensional GUI, illustrating an object being associated with a different cluster in accordance with an aspect of the present invention.

Some examples of features and functions that can be implemented relative to an object are described with respect to FIGS. 14, 15 and 16. Those skilled in the art will understand and appreciate various other features and functions that can be performed relative to an object based on this description.

FIG. 14 illustrates an example of an object context menu 436 that contains menu options for operations that can be implemented relative to the a selected object 350. The example in FIG. 14 includes an annotate option that can be selected to edit the annotation 432 associated with the object 350. In addition or alternatively, an audio, video or additional textual annotations can be associated with the object 350 via this option. A view option enables a user to adjust the view of the graphical image being displayed. For example, the scaling size of the object can be adjusted. Additionally or alternatively, other image controlled or image enhancement features can be implemented relative to the object 350.

The menu 436 also includes a send to option, which is similar to the cluster context menu send to option shown and described with respect to FIG. 9. Thus by selecting the send to option with the pointer 400, a send to menu is displayed illustrating various possible destinations to which the selected object 350 can be sent. The selected object and any data or applications associated therewith can be sent to a desired destination, which can be a user-defined destination or a destination otherwise made known to the GUI 300. Examples of possible destinations are illustrated in FIG. 14 and have been described above with respect to FIG. 9 and thus have been omitted here for sake of brevity.

The context menu 436 also can include editing options that can be performed on the selected object 350. The editing options, for example, can include cutting, copying, pasting, duplicating and/or deleting of the object. A duplicate of the object 350 can be a full copy of the object and its associated data and applications (e.g., its entire data structure) or it can simply be a copy of the thumbnail representation of the object displayed in the GUI 300 together with a memory pointer to its associated data structure.

In addition to performing the operations listed in the context menu 436 relative to the selected object 350, a selected object can be moved within the image space of the GUI 300. FIG. 15 illustrates an example in which the selected object 350 has been moved from the cluster 312 into the cluster 310. The change in association can be based on a distance metric performed based on the location of the object 350 and its relative location of the cluster indicators 318 and 320. In particular, as the object 350 becomes closer to the cluster indicator 318 than the indicator 320, the object 350 becomes associated with the cluster 310. In conjunction with this association, the banner of the cluster 350 also is updated to reflect the change in association, namely it has the same color of the banner of the cluster 310. Further, as the object 350 is moved in the direction of the arrow 440, the object 346 moves in the direction of the arrow 442 so as to avoid a parent contact with the object 350. This avoidance can be determined as a function of the two-dimensional or three-dimensional distance as described herein.

FIG. 15 also depicts that the banner of the selected object 350 has changed based on its change in membership to the cluster 310. Recall back in FIG. 7, the cluster label 326 has a red banner 370 and the cluster label 328 has a violet banner. Thus, in response to the object 350 being changing association from the cluster 312 to the cluster 310, its banner also changes from violet to red, as illustrated by appropriate stippling in FIG. 15. FIG. 16 illustrates the object 346 rebounding after interaction with the object 350 as shown in FIG. 15. The object's 350 annotation 432 also is shown due to activation of the object by placement of the pointer 400. A clustering process associated with each cluster further can automatically arrange the objects in a desired orientation relative to the indicator 318.

Figure 17:
FIG. 17 is an example of a display of a three-dimensional GUI, illustrating a global menu in accordance with an aspect of the present invention.

FIG. 17 illustrates an example of a global context menu 450 that can be used to perform global operations relative to the GUI 300 in accordance with an aspect of the present invention. In this example, the menu 450 includes options to import photos, to create a new cluster, to restore the GUI 300 to its original configuration, a scaling option, as well as an option to adjust the appearance of the surface 302. Another option might be to conduct a search of the objects and/or clusters in the image space, which search can be a text based search and/or a search based on image content. The global context menu 450 can be activated, for example, by appropriately selecting the background 302 with the pointer 400 (e.g., by right-clicking with a mouse). In the example of FIG. 17, the import photo option has been selected.

Figure 18:
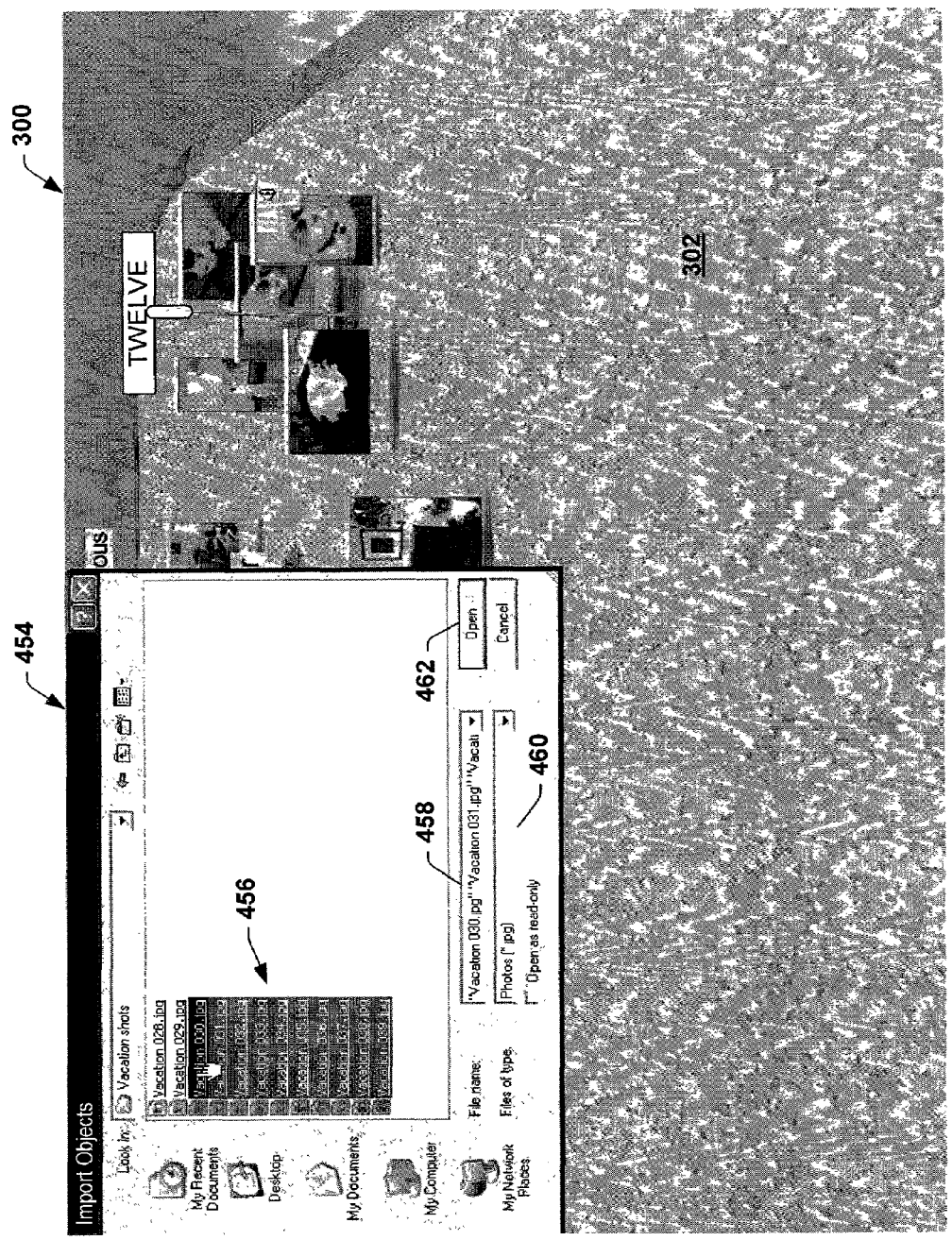
FIG. 18 is an example of a display of a three-dimensional GUI, illustrating an import objects dialog in accordance with an aspect of the present invention.

FIG. 18 illustrates an example of an import objects dialogue that can be implemented in response to selecting the import objects option of the context menu 450 (FIG. 17). The import objects option 454 provides a user with an interface from which desired files can be accessed and selected for importation into the GUI 300. The dialog can be any conventional file manipulation user interface, such as typically is implemented in conjunction with a file management system of an operating system. In this example, the user has selected with the pointer 400, several images (e.g., photographs) to be imported into the GUI 300. The selection of the files from the dialog 450 can be made via a pointing device, a keyboard or other user input device. The selected files appear in a file name dialogue box 458, a file type or types for the selected files also can be displayed in a file type dialogue box 460. Once the user has selected the desired file to be imported, the user can initiate the importation via an "open" user interface button 462. Those skilled in the art will understand and appreciate various types of dialogue and file management systems that can be utilized to facilitate importation of objects into the GUI 300, all of which are contemplated as falling within the scope of the present invention. For example, digital photographs can be imported into the GUI 300 by connecting a digital camera to the PC, such that the images not already present are automatically imported.

Figure 19:
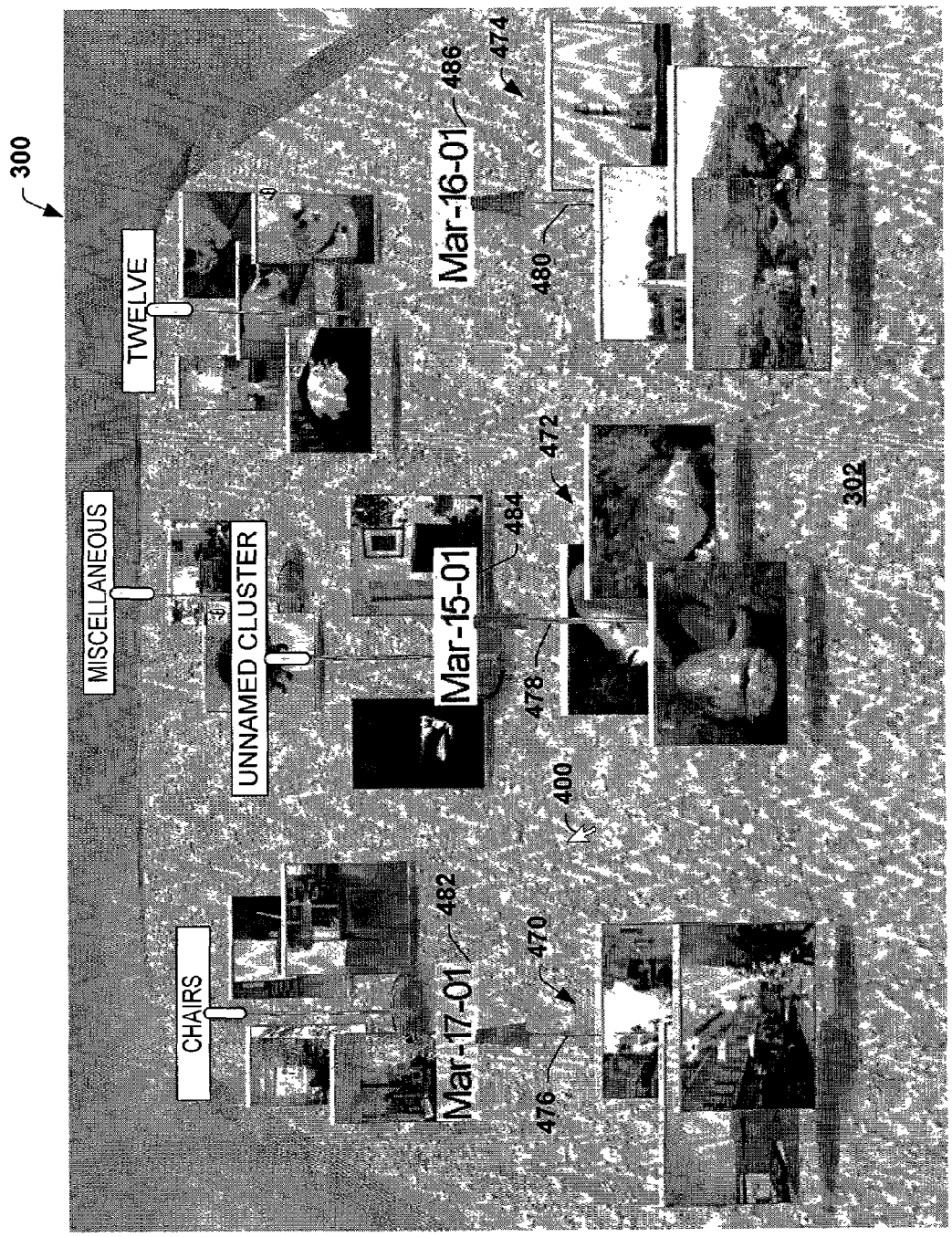
FIG. 19 is an example of a display of a three-dimensional GUI, illustrating new clusters imported into the GUI in accordance with an aspect of the present invention.

FIG. 19 illustrates an example in which graphical representations corresponding to the ten selected files in FIG. 18 have been imported into three respective clusters 470, 472 and 474. Each of the clusters 470, 472 and 474 also includes a corresponding cluster indicator 476, 478, 480, respectively. The cluster indicators 476, 478 and 480 also can be automatically provided with cluster labels 482, 484 and 486. The cluster indicator 476, 478 and 480 can be generated based on the particular objects being imported. For example, clustering controls can be programmed to implement clustering based on the date of the image files or other data attributes being imported into the system. Alternatively or additionally, a clustering algorithm can be employed to group various data objects or images based on other common attributes, such as other metadata, as well as based on the similarities between the objects. For example, the images themselves can be processed and analyzed to determine image similarities, such as common representations of people, places, animals or things within the images and, in turn, group the objects based on detecting such similarities. As mentioned above, the graphical objects in each of the respective clusters can share a common banner attributes to help delineate the different clusters.

Additionally, when documents or images are imported as one or more new clusters, if there is not enough room on the surface 302 for the new cluster(s), the system can move or rearrange clusters so as to make room for the new cluster. However, for circumstances in which rearranging the clusters does not provide sufficient room to place the new cluster(s), the system can automatically scale clusters to a smaller size so as to create sufficient space on the surface 302 for the new clusters. It is to be appreciated that similar rearranging and/or scaling can be implemented in situations when space constraints exist and documents and/or images are imported into existing clusters.

Figure 20:
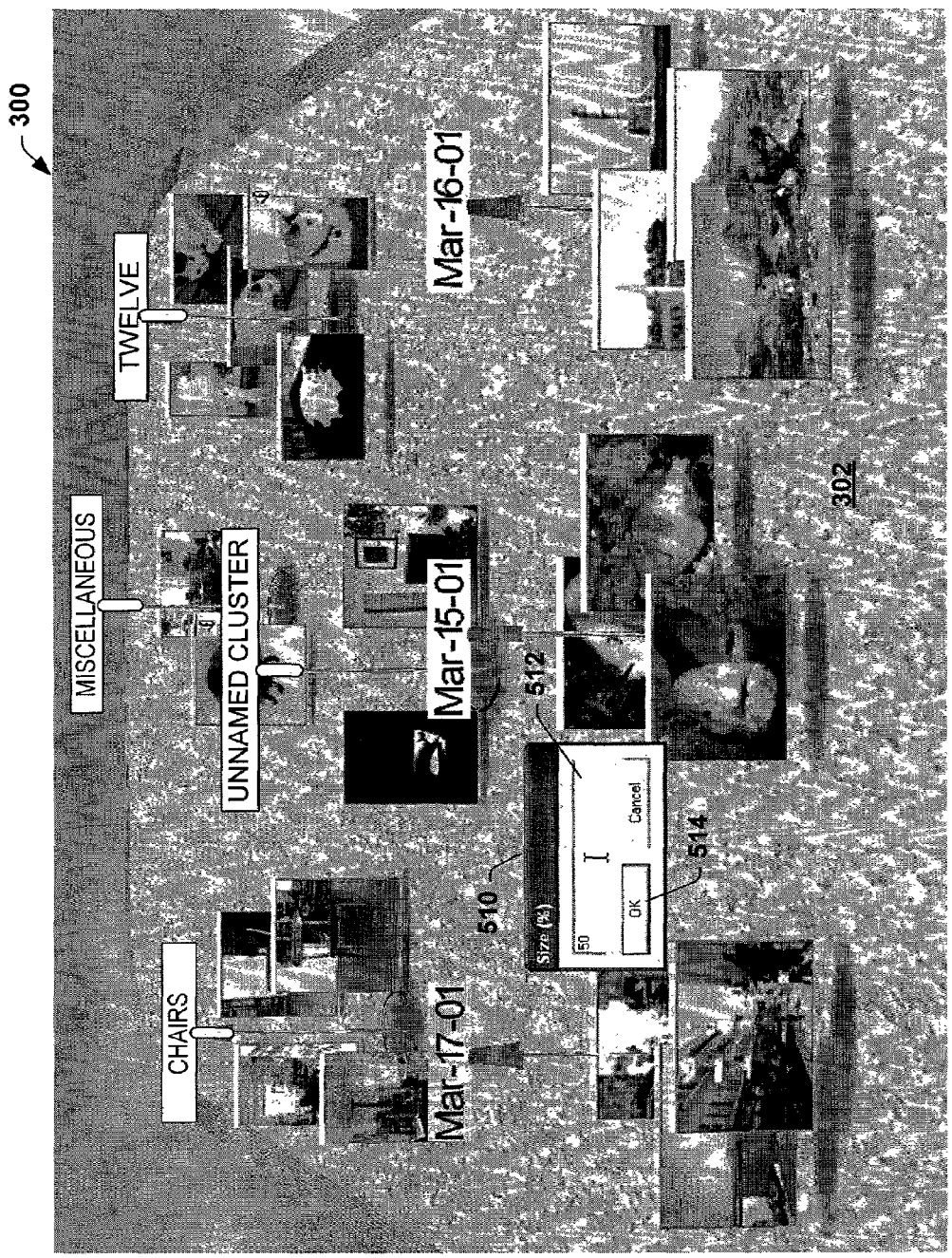
FIG. 20 is an example of a display of a three-dimensional GUI, illustrating a scaling dialog in accordance with an aspect of the present invention.

As mentioned above with respect to FIG. 17, the global context menu also can be used to resize the clusters in the image space of the GUI 300. For example, by selecting the size option of the context menu 450, a resizing (or scaling) dialog box 510 can be displayed on the GUI for entering desired resizing, as shown in FIG. 20. The resizing dialog 510, for example, includes a space 512 in which a user may enter a desired size (e.g., in percentage) to implement relative to the surface 302. After entering the desired size in the space 512, a user may select an appropriate button 514 to apply the new size to the GUI 300.

Figure 21:
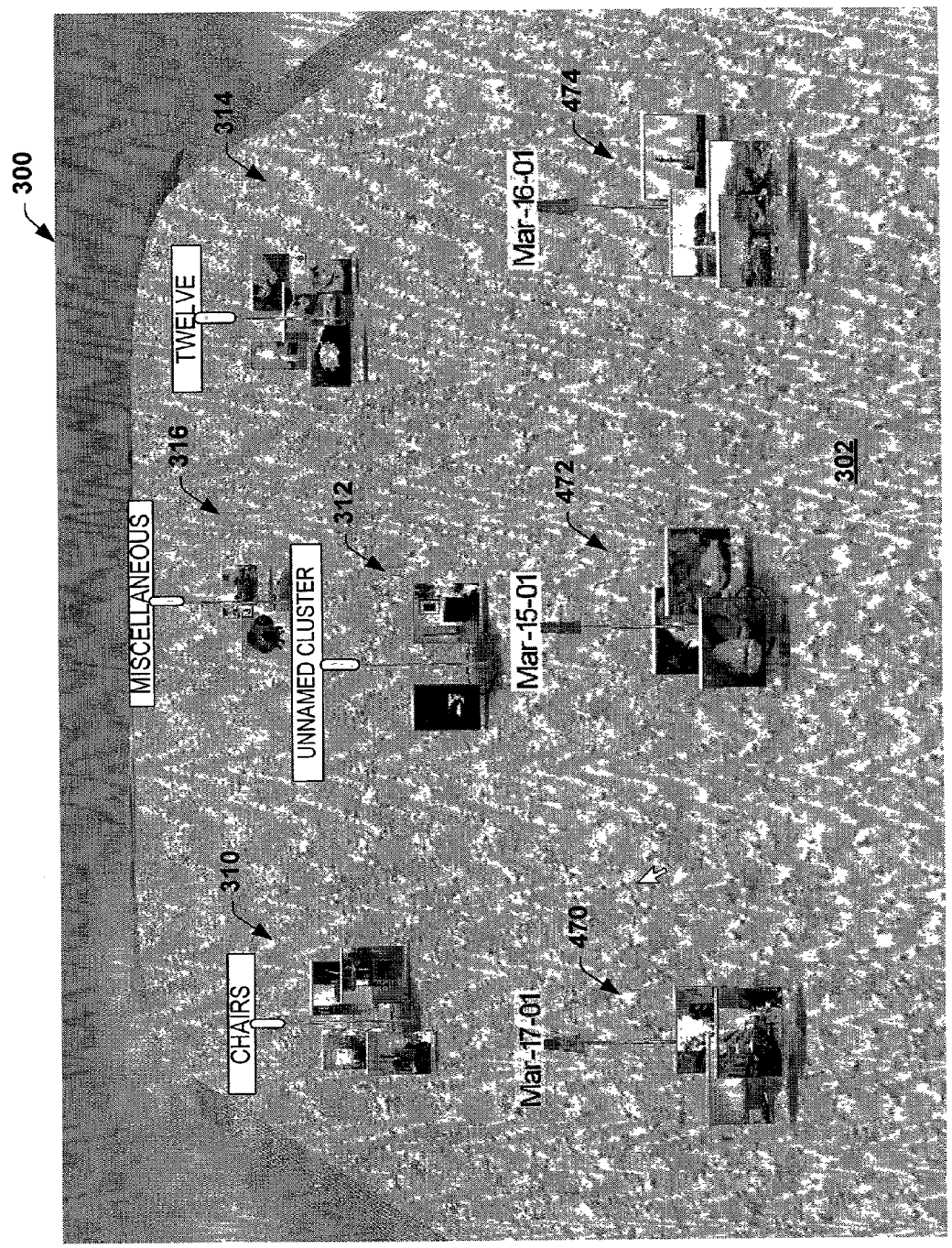
FIG. 21 is an example of a display of a three-dimensional GUI, illustrating parts of the GUI rescaled in accordance with an aspect of the present invention.

By way of illustration, if a user desires to reduce the size of the graphical objects by about 50%, a user may enter "50" in the space 512 and apply the resizing via the button 514. FIG. 21 illustrates a result of such resizing in which the size of the graphical objects has been reduced to approximately 50% relative to their size shown in FIG. 20. It is to be noted that the cluster indicators, however, have been reduced proportionally in size by an amount less than 50%. This can be advantageous, especially when objects are being reduced quite small. This enables the cluster labels to remain legible to the user and thereby providing effective mechanism for locating a desired cluster, even if a particular set of graphical objects may be too small to discern. However, it is to be appreciated that even at 50% of its original size, most graphical objects will still be recognizable to a viewer. This becomes more evident as the system takes advantage of the user's spatial memory wherein the user recalls what images have been placed at what locations of the surface 302. Those skilled in the art will understand and appreciate that such a three-dimensional approach can enable about 600 to about 700 images to be displayed in a recognizable fashion in the GUI 300 in accordance with an aspect of the present invention. This provides a powerful mechanism to view images, access information or applications associated with such images in a user-friendly manner.

Figure 22:
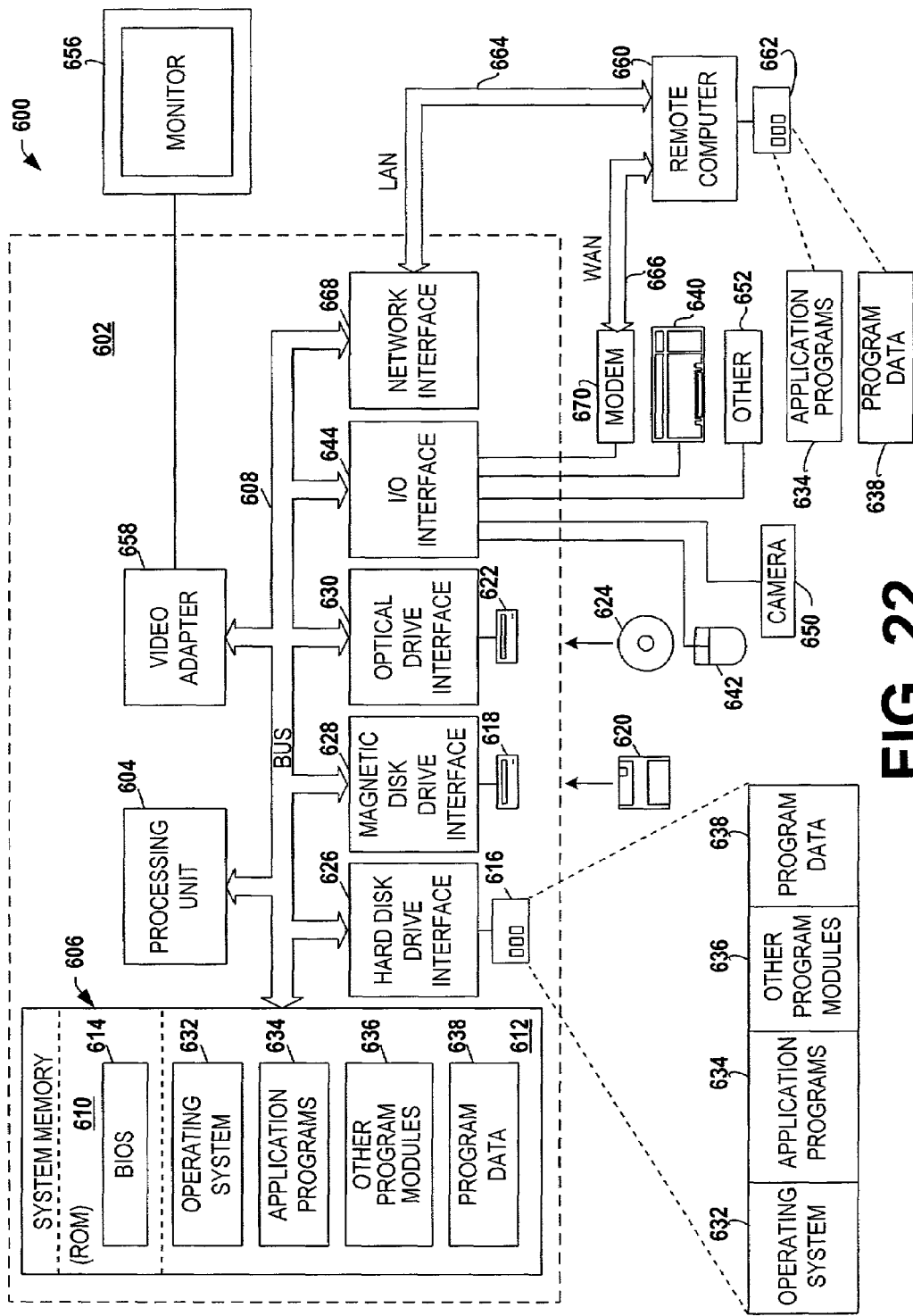
FIG. 22 is an example of a possible operating environment in which aspects of the present invention can be implement.

In order to provide additional context for implementing various aspects of the present invention, FIG. 22 and the following discussion are intended to provide a brief, general description of a suitable computing environment 600 in which the various aspects of the present invention may be implemented.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 22, an exemplary system environment 600 for implementing the various aspects of the invention includes a conventional computer 602, including a processing unit 604, a system memory 606, and a system bus 608 that couples various system components, including the system memory, to the processing unit 604. The processing unit 604 may be any commercially available or proprietary processor. In addition, the processing unit may be implemented as multi-processor formed of more than one processor, such as may be connected in parallel.

The system bus 608 may be any of several types of bus structure including a memory bus or memory controller, a peripheral bus, and a local bus using any of a variety of conventional bus architectures such as PCI, VESA, Microchannel, ISA, and EISA, to name a few. The system memory 606 includes read only memory (ROM) 610 and random access memory (RAM) 612. A basic input/output system (BIOS) 614, containing the basic routines that help to transfer information between elements within the computer 602, such as during start-up, is stored in ROM 610.

The computer 602 also may include, for example, a hard disk drive 616, a magnetic disk drive 618, e.g., to read from or write to a removable disk 620, and an optical disk drive 622, e.g., for reading from or writing to a CD-ROM disk 624 or other optical media. The hard disk drive 616, magnetic disk drive 618, and optical disk drive 622 are connected to the system bus 608 by a hard disk drive interface 626, a magnetic disk drive interface 628, and an optical drive interface 630, respectively. The drives 616–622 and their associated computer-readable media provide nonvolatile storage of data, data structures, computer-executable instructions, etc. for the computer 602. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 600, and further that any such media may contain computer-executable instructions for performing the methods of the present invention.

A number of program modules can be stored in the drives 616–622 and RAM 612, including an operating system 632, one or more application programs 634, other program modules 636, and program data 638. The operating system 632 can be any suitable operating system or combination of operating systems. By way of example, the application programs 634 and program modules 636 can include an object management system that includes executable instructions for implementing a GUI according to an aspect of the present invention. Additionally, the program data 638 can include input image data that can be used to populate the GUI with graphical objects.

A user can enter commands and information into the computer 602 through one or more user input devices, such as a keyboard 640 and a pointing device (e.g., a mouse 642, a touch screen, a touch pad, and so forth). Other input devices (not shown) may include a microphone, a joystick, a game pad, a satellite dish, wireless remote, a scanner, or the like. These and other input devices are often connected to the processing unit 604 through an I/O interface 644 that is coupled to the system bus 608. Those skilled in the art will understand and appreciate various other types of interfaces that can be used to connect such devices, including, for example, a parallel port, a game port, a universal serial bus (USB) hub and the like.

Other devices also can be coupled to the computer 602 via the I/O interface 644. For example, a digital camera 650 or other external devices (e.g., electronic picture frames, small form factor I/O devices) 652 can be coupled to the computer 602 for sending or receiving data (e.g., image data, audio data, textual data, and/or video data) relative to the computer, as described herein. When data is provided to the computer from such a device, the imported data can be used to populate the image space of the GUI with graphical objects (e.g., thumbnails) representing the imported data. Data also can be sent from the GUI to the camera 650 or the other devices 652.

A monitor 656 or other type of display device is also connected to the system bus 608 via an interface, such as a video adapter 658. The computer 602 can include other peripheral output devices (not shown), such as speakers, printers, etc. Those skilled in the art will understand how the computer can send data to such devices based on the description contained herein.

It is to be appreciated that the computer 602 can operate in a networked environment using logical connections to one or more remote computers 660. The remote computer 660 may be a workstation, a server computer, a router, a peer device or other common network node, and typically includes many or all of the elements described relative to the computer 602, although, for purposes of brevity, only a memory storage device 662 is illustrated in FIG. 5. The logical connections depicted in FIG. 5 may include a local area network (LAN) 664 and a wide area network (WAN) 666. Such networking environments are commonplace in offices, enterprise-wide computer networks, intranets and the Internet.

When used in a LAN networking environment, for example, the computer 602 is connected to the local network 664 through a network interface or adapter 668. When used in a WAN networking environment, the computer 602 typically includes a modem (e.g., telephone, DSL, cable, etc.) 670, or is connected to a communications server on the LAN, or has other means for establishing communications over the WAN 666, such as the Internet. The modem 670, which can be internal or external relative to the computer 602, is connected to the system bus 608 via the serial port interface 644. In a networked environment, program modules (including application programs 634) and/or program data 638 can be stored in the remote memory storage device 662. It will be appreciated that the network connections shown are exemplary and other means (e.g., wired or wireless) of establishing a communications link between the computers 602 and 660 can be used when carrying out an aspect of the present invention. Thus, data can be transferred between such computers 602 and 660 using a GUI implemented in accordance with an aspect of the present invention.

The illustrated aspects of the invention can also be practiced in distributed computing environments, where certain tasks are performed by remote processing devices that are linked through a communications network, such as the LAN 264 or WAN 266. In a distributed computing environment, program modules may be located in local memory 212 (as well as 216, 218, 222) and/or remote memory storage devices 262. It is to be appreciated, however, that some, if not all, aspects of the invention can be practiced on stand-alone computers.

In accordance with the practices of persons skilled in the art of computer programming, the present invention has been described with reference to acts and symbolic representations of operations that are performed by a computer, such as the computer 602 or remote computer 660, unless otherwise indicated. Such acts and operations are sometimes referred to as being computer-executed. It will be appreciated that the acts and symbolically represented operations include the manipulation by the processing unit 604 of electrical signals representing data bits which causes a resulting transformation or reduction of the electrical signal representation, and the maintenance of data bits at memory locations in the memory system (including the system memory 606, hard drive 616, floppy disks 620, CD-ROM 624, and remote memory 662) to thereby reconfigure or otherwise alter the computer system's operation, as well as other processing of signals. The memory locations where such data bits are maintained are physical locations that have particular electrical, magnetic, or optical properties corresponding to the data bits.

While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may operatively communicate with one or more associated devices.

In view of the foregoing structural, functional, and graphical features described above, methodologies in accordance with the present invention will be better appreciated with reference to FIGS. 23–27. Some functional aspects of the methodologies are represented as state diagrams, while other aspects are represented as flow diagrams. It is to be understood and appreciated that, while the flow diagrams are shown and described as executing serially, it is to be understood and appreciated that the present invention is not limited by the illustrated order, as some aspects could, in accordance with the present invention, occur in different orders and/or concurrently with other aspects from that shown and described herein. More generally, not all illustrated features may be required to implement a methodology in accordance with an aspect the present invention. It is further to be appreciated that the following methodologies can be implemented as computer-executable instructions, such as software stored in a computer-readable medium. Alternatively, the methodologies could be implemented as hardware or a combination of hardware and software.

Figure 23:
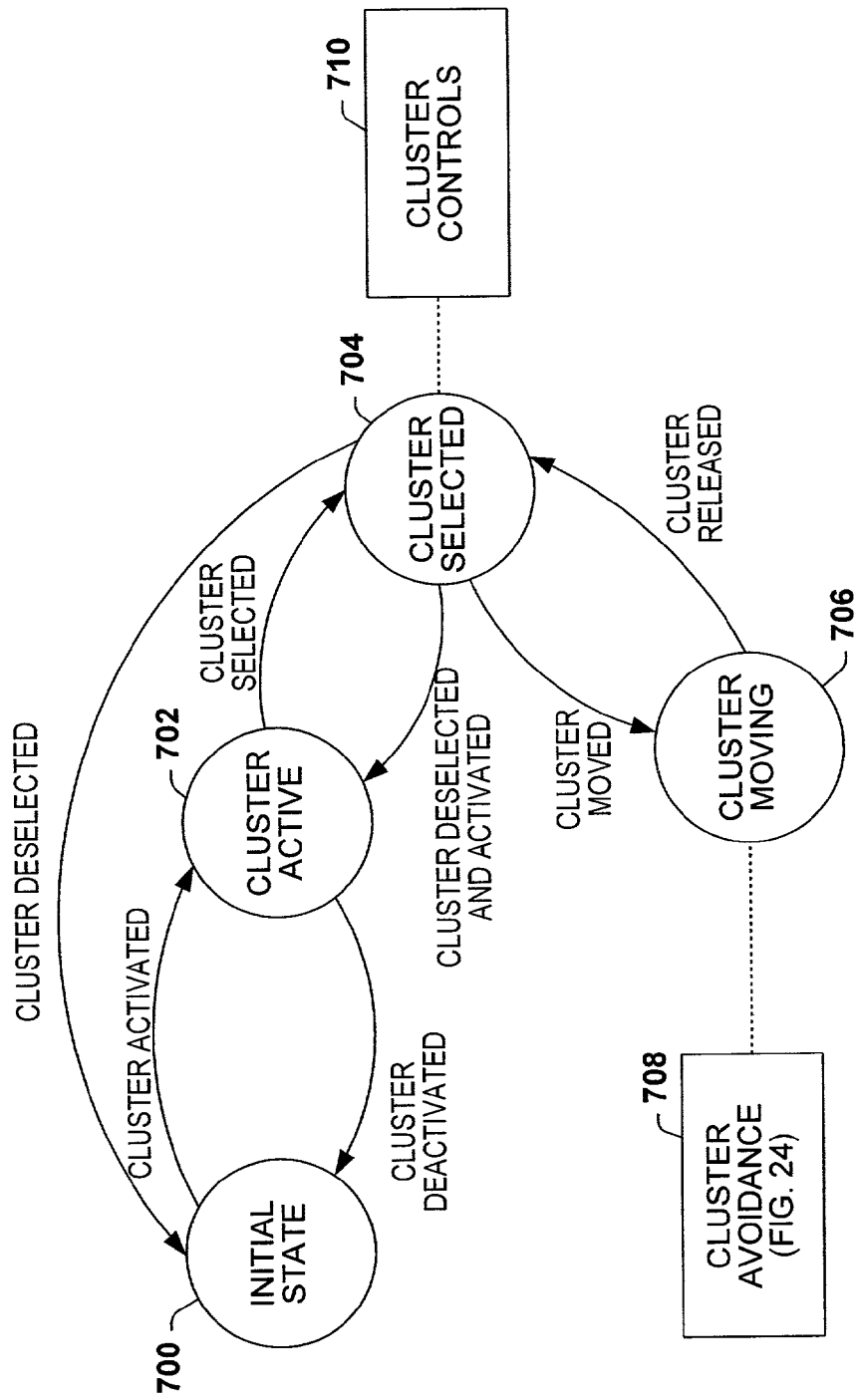
FIG. 23 is state diagram for a cluster in accordance with an aspect of the present invention.

FIG. 23 depicts a state diagram of a cluster, illustrating different operating states and state transitions in accordance with an aspect of the present invention. As described herein, the cluster includes a cluster indicator that is used to visually represent a group of graphical objects in an image space of a GUI. The graphical objects can be two-dimensional images that represent data, such as textual data, image data, graphical data, audio data and/or video data. The graphical objects can be displayed as low-resolution graphical representations (e.g., thumbnails) corresponding to the type of information they represent. As described herein, a cluster can be created manually by a user or automatically, such as in conjunction with importing one or more graphical objects into the image space associated with the GUI.

A cluster can operate one or more operating states based on user interaction with the GUI, such as supplied via a user input device (e.g., a mouse, light pen, touch screen, touch pad, etc.). For sake of brevity, much of the following discussion describes user inputs entered by a mouse, although it is to be appreciated that any type of input device could be used. Initially (absent user interaction), the cluster operates in an initial state indicated at 700. The "initial" state 700 can correspond to an inactive cluster condition, in which its cluster indicator and associated graphical objects (if any) are represented in the image space of the GUI.

Upon activation of a cluster, the cluster enters an "active" state at 702, which can include graphically highlighting the active cluster and its associated object and indicator. Cluster activation can occur, for example, by positioning or passing a pointer (or cursor) over a predetermined part of the cluster, such as the cluster indicator. Similarly, the cluster can be "deactivated" when the pointer is taken off the cluster, in which the "initial" inactive state 700 is reentered. When in the "active" state 702, the cluster can be selected to enter a "selected" state at 704. Such selection can occur, for example, by a mouse click that occurs while the pointer is on or within a predetermined distance of the cluster indicator. Those skilled in the art will understand and appreciate that one or more clusters also could be selected by appropriate selection of multiple clusters.

While in the "selected" state 704, if the selected cluster is pulled or pushed, for example, via a traditional left mouse button clicking and dragging operation, the cluster enters a "moving" state at 706. It is to be appreciated that the "moving" state 706 can be entered from the "active" state as well, such as by implementing a left button click-and-hold operation (thereby selecting the cluster and entering state 704) and then dragging the cluster accordingly. A cluster avoidance methodology 708 further can be implemented as the cluster is in the "moving" state. When the cluster is in the state 706, its location information will be updated, which facilitates the cluster avoidance at 708. An example of a cluster avoidance methodology is shown and described below with respect to FIG. 24. Basically, the cluster avoidance 708 provides a mechanism to enable one or more clusters to avoid other clusters while moving, such as by pushing the non-moving cluster to a new location. From the "moving" state 706, if the cluster is released, for example, by releasing the left mouse button during a drag operation, the cluster returns to the "selected" state at 704. The selected cluster also can be deselected to transition to either its "active" 702 state or its "initial state" 700, such as depending on the pointer location when deselected.

Cluster controls 710 also can be implemented on a cluster when in its "selected" state 704. The cluster controls 710 can be activated, for example, by a common right-clicking action with a mouse when the pointer is positioned on the cluster. It is to be appreciated that the cluster controls thus also can be accessed from the "active" state 702 in response to a similar user input. The cluster controls can be represented on the GUI as a context menu that provides options that can be selected to perform different operations relative to the cluster. Those skilled in the art will understand and appreciate various operations that can be performed for a cluster, for example, based on the subject matter shown and described with respect to FIGS. 6 and 8–10. Briefly stated, a selected cluster, including annotations and associated graphical objects, can be viewed in a desired format, deleted or renamed. The cluster also can be sent to a person, a computer, application program, Web site, or external device (e.g., electronic picture frame). Those skilled in the art will understand and appreciate various other operations that might be performed relative to a cluster in accordance with an aspect of the present invention.

Figure 24:
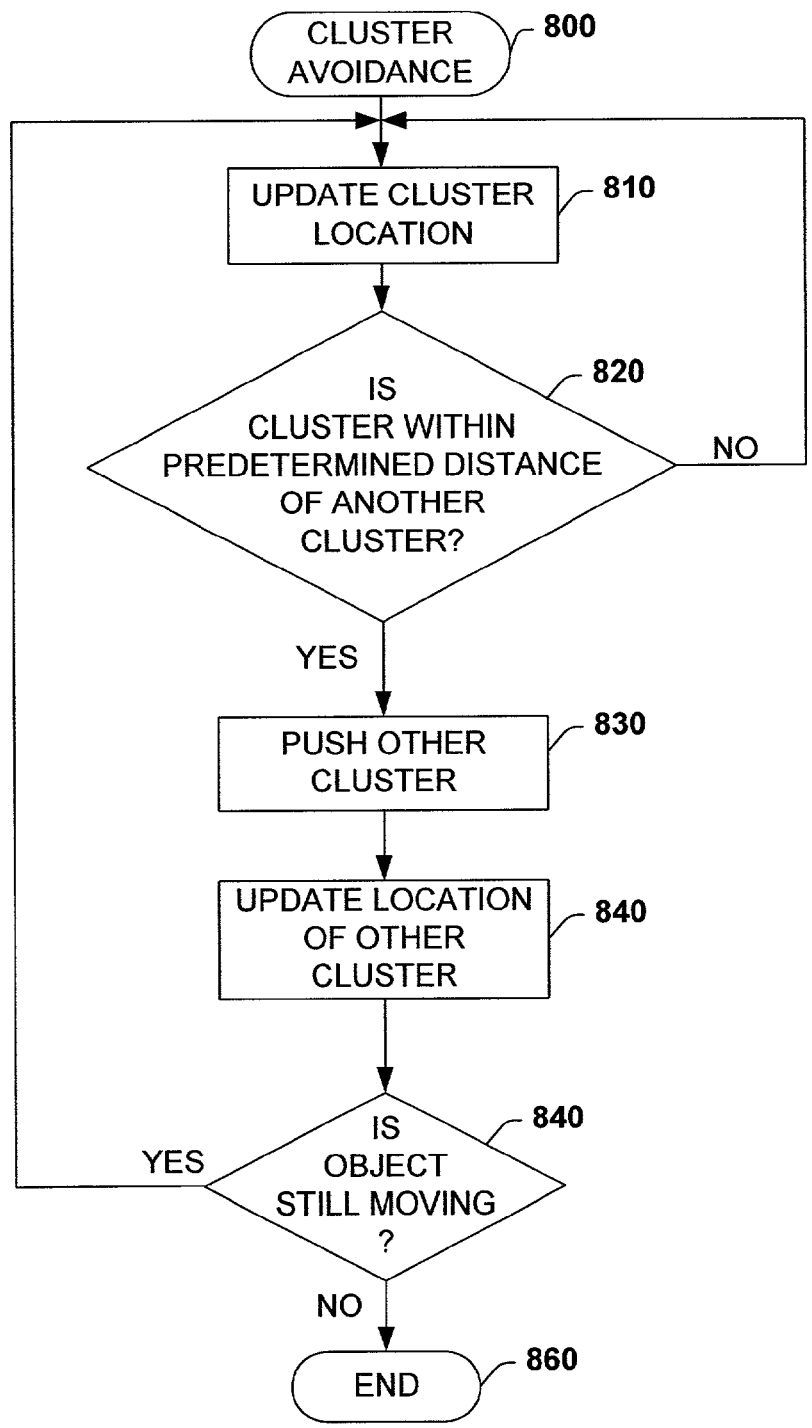
FIG. 24 is a flow diagram illustrating a methodology for cluster avoidance in accordance with an aspect of the present invention.

FIG. 24 is a flow diagram illustrating a methodology to implement cluster avoidance in accordance with an aspect of the present invention. Cluster avoidance is implemented to mitigate total occlusion of other objects in the image space. The methodology begins at 800, such as in connection with a cluster entering its "moving" state 706 (FIG. 23). At 810, the cluster location is updated. The updated position can be determined as a two-dimensional or virtual three-dimension position according to the configuration of the image space. The new position information can be stored in memory and continually be updated so long as the cluster is moving.

Next, at 820, a determination is made as to whether the cluster has moved to within a predetermined distance of another cluster. This distance determination can be based on the relative location of adjacent clusters in virtual three-dimensional space, a two-dimensional projection of the virtual three-dimensional space or a two-dimensional screen position of the respective clusters. For example, a virtual bumper (e.g., represented as a shadow) can be employed to represent the predetermined distance of the cluster being moved. If the determination is negative, the methodology returns to 810. If the cluster that is being moved is within a predetermined distance of another cluster(s), the methodology proceeds to 830.

At 830, the other cluster, including its indicator and associated graphical objects, is pushed in a direction away from the moving cluster. The direction of the push, for example, can correspond to direction of the moving cluster. Alternatively, a predetermined push direction can be used (e.g., rearward or forward) depending on its location and the available image space. It is to be appreciated that when one cluster is pushed to avoid a moving cluster, the pushed cluster can cause other clusters to be pushed. At 840, the location of the cluster or clusters pushed at 830 is updated.

Those skilled in the art will understand and appreciated that a methodology according to FIG. 24 can be implemented for all moving clusters, either dragged by a user or pushed by another cluster. In this way, if one cluster is moved and gets too close to a second cluster so as to push it, the second cluster being pushed (in implementing the methodology) can, in turn, push a third cluster in the same direction, and so on. Thus, movement of one cluster can propagate movement of a plurality clusters in the same (or a different) direction.

It further is to be appreciated that clusters that are pushed could also be controlled to rebound to their pre-push locations, such as when the moving cluster is no longer within the predetermined distance of the pre-push location of the other cluster(s). Those skilled in the art will understand and appreciate various modes of animation that could be employed to visually represent such movement, pushing and/or rebounding of clusters.

At 850, a determination is made as to whether the cluster is still moving. As mentioned above, the cluster avoidance is utilized while a cluster is in its "moving" state. Thus, if the cluster is still moving, the methodology returns to 810 to continue the present methodology. If the determination at 850 is negative, indicating that the cluster is no longer moving, the methodology ends at 860. This can coincide with a state change of the cluster, for example, such as in connection with releasing the moving cluster.

Figure 25:
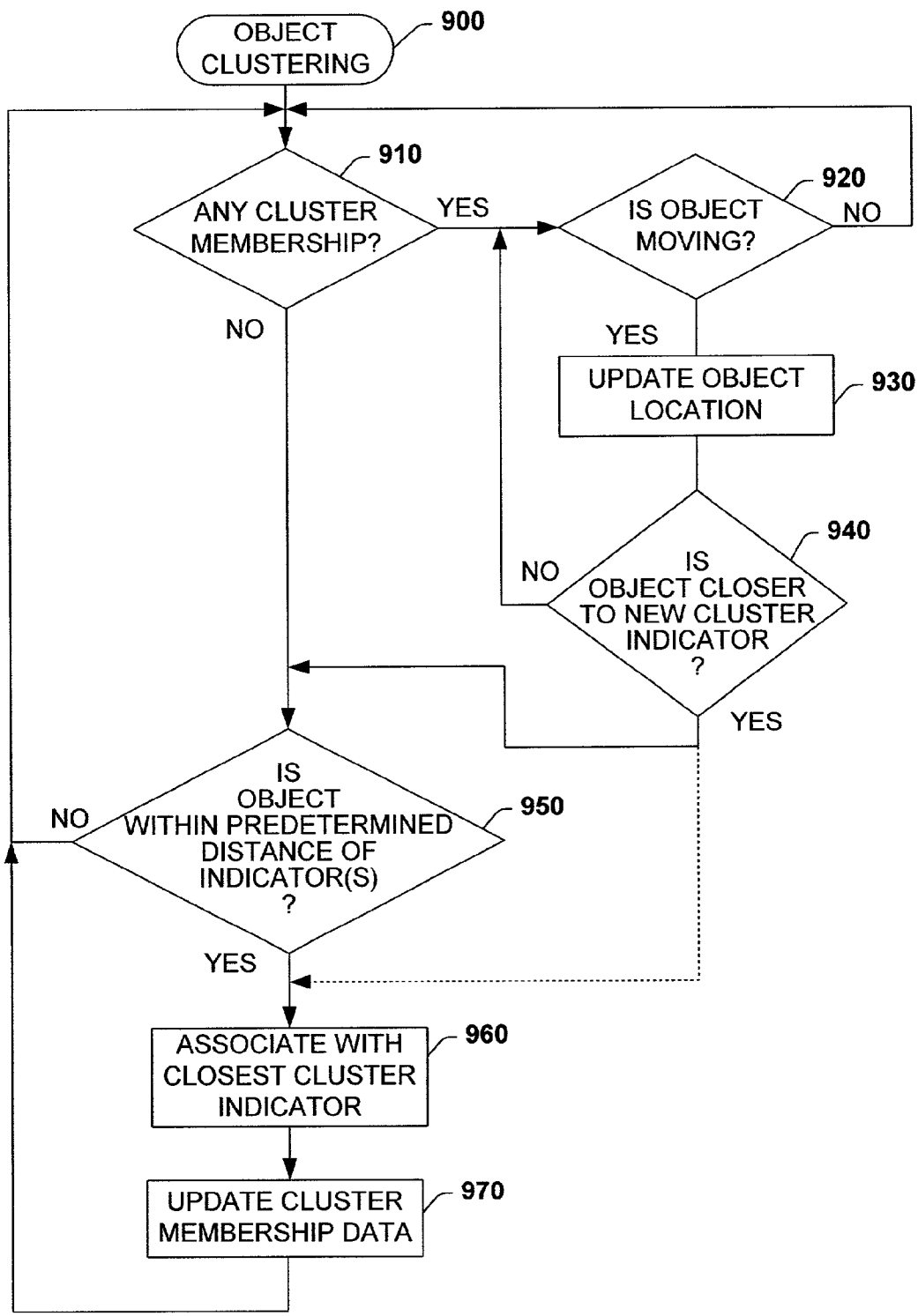
FIG. 25 is a flow diagram illustrating a methodology for clustering objects in accordance with an aspect of the present invention.

FIG. 25 is an example of a flow diagram illustrating a methodology that can be employed to implement clustering of an object in accordance with an aspect of the present invention. While the following methodology is described with respect to one object, it is to be appreciated that such methodology can (and typically would) be implemented for each cluster. This process further can run as background process to enable continuous updating of cluster membership. For example, the clustering methodology can be implemented for objects periodically at a desired interval, intermittently, or in response to different actions being performed relative to a given object.

The methodology begins at 900, such as in connection with activating or invoking a GUI that implements clustering in accordance with an aspect of the present invention. At 910 a determination is made as to whether the object has any defined cluster membership. Cluster membership identifies with which cluster (if any) the object has been visually associated. As mentioned above, the visual association can be represented by proximity of an object relative to a cluster indicator, common color coded banners or halos, for example. If the object does have cluster membership, the methodology advances to 920.

Figure 26:
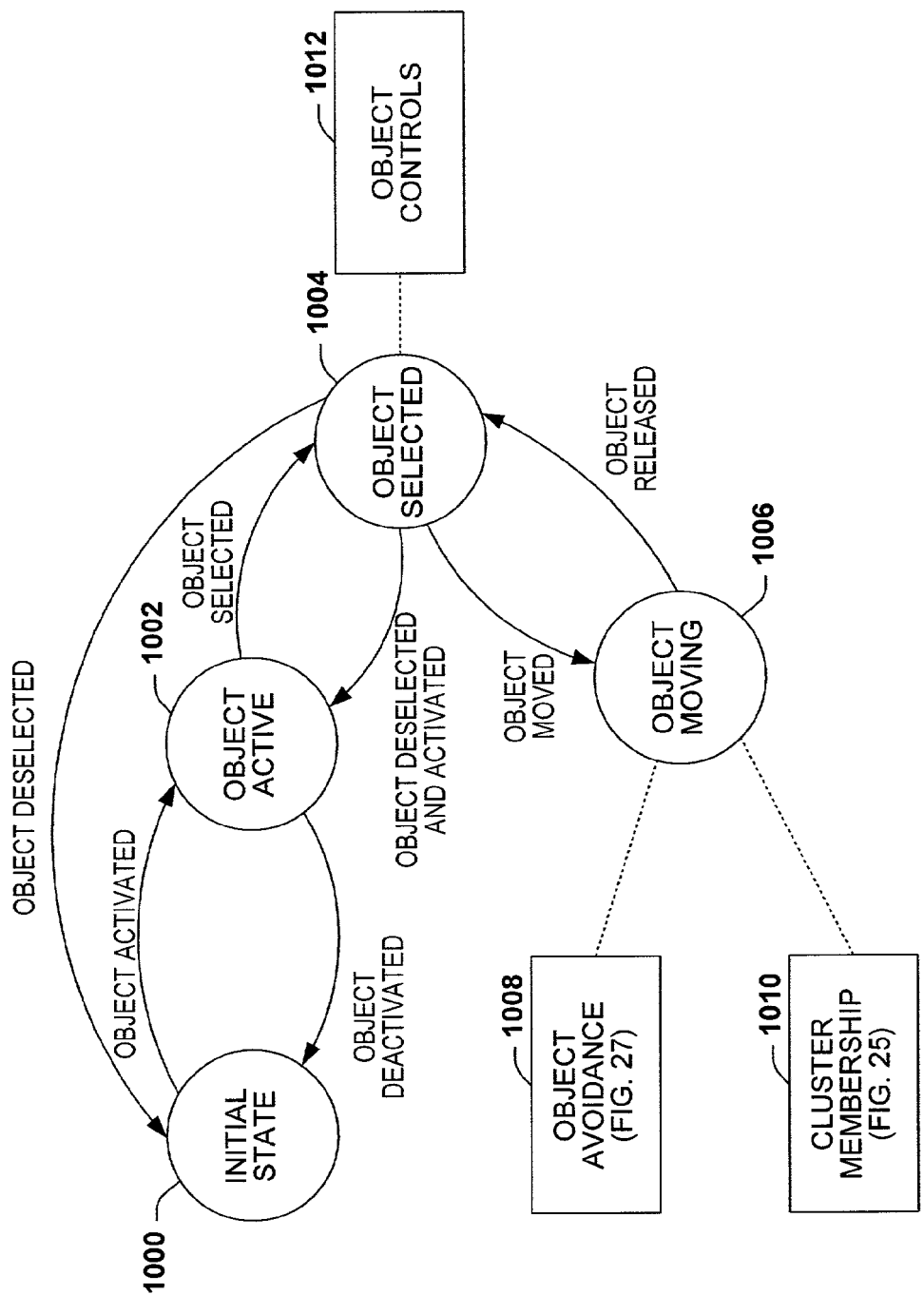
FIG. 26 is state diagram for an object in accordance with an aspect of the present invention.

At 920 a determination is made as to whether the object is moving apart from it associated cluster. For example, an object can move commensurately with movement of its cluster or individually (or with other objects) when the object(s) has been selected. If the object is not moving apart from its associated cluster, the methodology returns to 910 without an change to its cluster membership. If the object is moving (e.g., in its "moving" state as indicated in FIG. 26), the methodology proceeds to 930 in which its object location is updated accordingly. The object location, for example, can correspond to a virtual three-dimensional location, a two-dimensional projection of the virtual three-dimensional location or to a two-dimensional screen location.

Next, at 940, a determination is made as to whether the object is closer to a different cluster indicator than to its associated cluster indicator. If the determination is negative, the methodology returns to 920 in which 920–940 can be repeated. If the object becomes closer to a cluster indicator that is different from its associated indicator, the methodology proceeds to 950. Also, if the determination at 910 is negative (indicating no cluster membership), the methodology also proceeds to 950.

At 950 a threshold determination is made to discern whether the object is within a predetermined distance of the other cluster indicator(s). This predetermined distance can be set (e.g., by a developer or user) to control a proximity threshold as to how close an object must be to become associated with a cluster. For example, the threshold can range from zero (e.g., the object must contact the cluster indicator) to infinity (e.g., automatic object association with a cluster).

If the determination at 950 is affirmative, indicating that the object is within the threshold distance of the cluster, the methodology proceeds to 960. It will be appreciated that if the threshold is set high enough or if no threshold is employed, the methodology can proceed directly from 910 and 940 to 960, as represented by a dashed line. At 960, the object is visually associated with the closest cluster indicator so as to become a member of the cluster represented by such indicator. Animation can be employed to visualize such association. With such association, cluster membership data of the object also is updated at 970 to reflect the association at 960. The cluster data, for example, can include, data identifying the cluster, banner data so the object has the banner corresponding to the cluster and other data (e.g., audio, textual, video) that can help demonstrate membership of the object. From 970, the methodology can return to 910.

FIG. 26 depicts an example of a state diagram for a graphical object that can be implemented in a GUI in accordance with an aspect of the present invention. The state diagram illustrates different operating states and state transitions for the object. An object operates in its different states based on user interaction with the GUI. Initially (absent user interaction), the object operates in an "initial" state indicated at 1000. The "initial" state 1000 can be a default state in which the object is inactive.

Upon activation of an object, the object enters an "active" state indicated at 1002, which can result in the active object being highlighted. Object activation can occur, for example, by positioning or passing a pointer (or cursor) over or within a predetermined distance of the graphical object. Similarly, the object can be deactivated when the pointer is taken off the object, which results in a return to its "initial" state 1000. When in the "active" state 1002, the object can be selected (e.g., by a mouse click) to enter a corresponding "selected" state at 1004. Those skilled in the art will understand and appreciate that one or more objects also could be selected by selection of multiple objects with the pointer.

While in the "selected" state 1004, the selected object can be moved (e.g., pulled or pushed) so as to enter a "moving" state at 1006. For example, the object can be moved via a traditional left mouse button clicking and dragging operation. An object avoidance methodology 1008 further can be implemented as the object is in the "moving" state. When the object is in the state 1006, its location information is updated to facilitate the object avoidance at 1008. An example of an object avoidance methodology is shown and described below with respect to FIG. 27. Basically, the object avoidance 1008 causes non-moving objects to be moved if the moving object gets within a predetermined distance of the other object. The other object can be returned to its original pre-movement position if the moving has moved sufficiently from the other objects pre-push position. In addition, when an object is moving a clustering methodology 1010 can be implemented to dynamically associate the moving object with a new cluster based on its proximity with a cluster indicator of new cluster. From the "moving" state 1006, if the object is released, for example, by releasing the left mouse button during a drag operation, the object returns to its "selected" state at 1004. From the "selected" state 1004, the object can be deselected and enter its "active" state 1002 or its "initial" state 1000, such as based on the pointer location during its deselection.

Object controls 1012 also can be implemented relative to an object when in its "selected" state 1004. The object controls 1012 can be activated, for example, by a common right-clicking action with a mouse when the pointer is positioned on the object. It is to be appreciated that the object controls thus also can be accessed from the "active" state 1002 in response to a similar user input. The object controls can be represented on the GUI as a context menu that provides options that can be selected to perform different operations relative to the object. Those skilled in the art will understand and appreciate various operations that can be performed for an object, for example, based on the subject matter shown and described with respect to FIGS. 6, 13 and 14.

Figure 27:
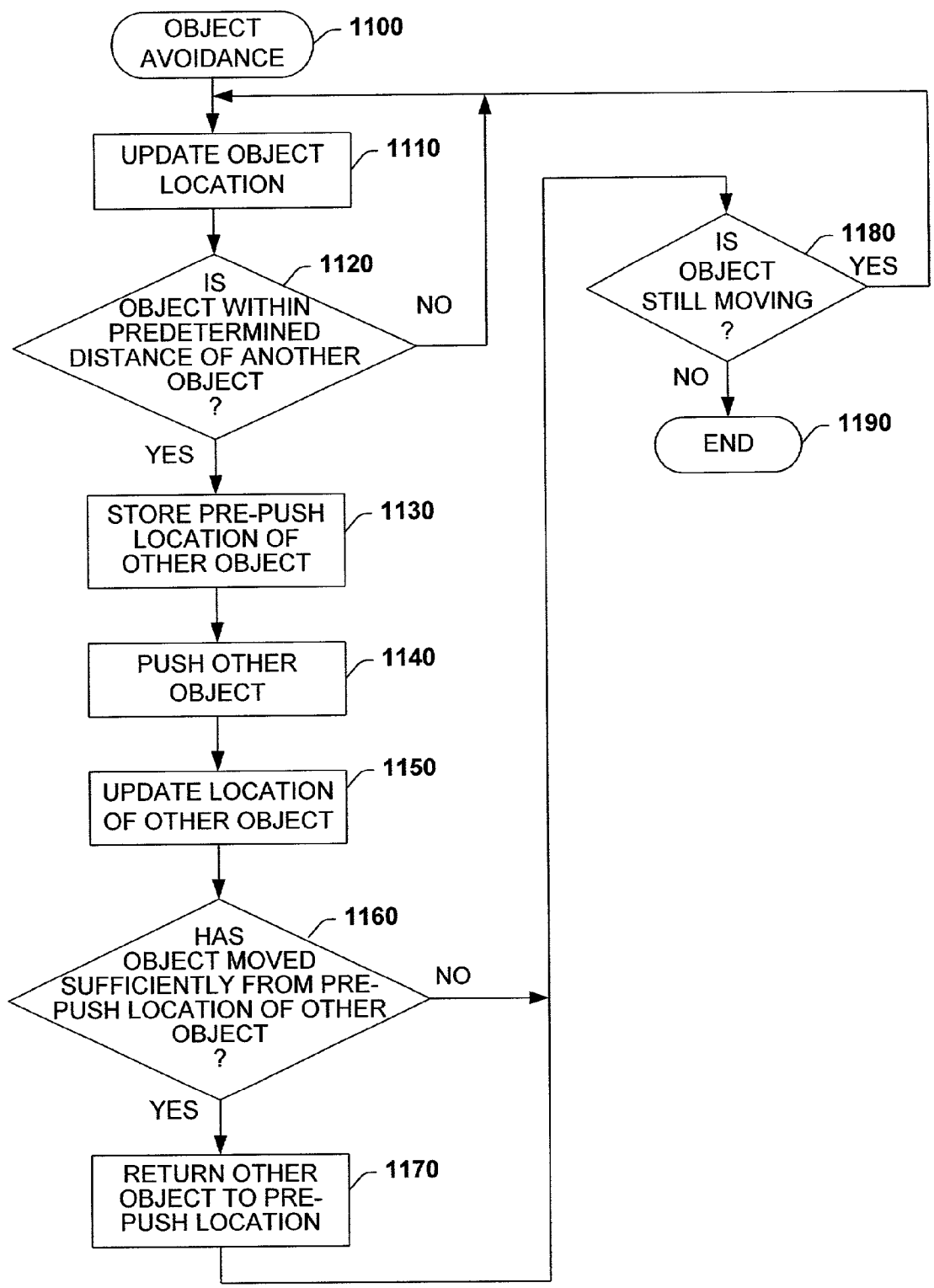
FIG. 27 is a flow diagram illustrating a methodology for object avoidance in accordance with an aspect of the present invention.

FIG. 27 is a flow diagram illustrating a methodology to implement object avoidance in accordance with an aspect of the present invention. Object avoidance is implemented to mitigate total occlusion of other objects in the image space. The methodology begins at 1100, such as in connection with an object entering its "moving" state 1006 (FIG. 26). At 1110, the object location is updated according to its relative position in the GUI. The updated position can be determined as a two-dimensional or virtual three-dimension position according to the configuration of the image space. The new position information can be stored in memory and be updated while the object is moving.

Next, at 1120, a determination is made as to whether the object has moved to within a predetermined distance of another object. This distance determination can be based on the relative distance between adjacent objects in virtual three-dimensional space, a two-dimensional projection of the virtual three-dimensional space or a two-dimensional distance between the respective objects. If the determination is negative, the methodology returns to 1110. If the object has moved to within a predetermined distance of one or more other objects, the methodology proceeds to 1130.

At 1130, a pre-push location of the other object(s) is stored. The pre-push position corresponds to an original position of the other object to which it can be returned during a rebound animation process. Then, at 1140, the other object is pushed (e.g., via animation) in a direction to avoid the moving object. The direction of the push, for example, can correspond to a direction generally normal to a direction in which the object is moving. For example, if an object is moving generally rearward, the other object can be moved laterally away from its associated cluster indicator. It is to be appreciated that when one object is pushed to avoid the moving object, the pushed object can cause other objects to be pushed, such as when there are many objects associated with a given cluster indicator or when clusters are arranged relatively close to each other in the image space. At 1150, the location of the object or objects pushed at 1140 is updated accordingly. Those skilled in the art will understand and appreciate various modes of animation that could be employed to visually represent such movement, pushing and/or rebounding of objects.

At 1160, a determination is made as whether the object being moved has moved a sufficient distance away from the other objects pre-push location. If the object has move sufficiently away from the other objects pre-push location, the methodology proceeds to 1170. At 1170, the other object can be animated to return to its pre-push location. If the image space is too crowded, however, the other object may return or rebound to a location near its pre-push location so as to reduce possible occlusion. From 1170, the methodology proceeds to 1180. Also, if the determination at 1160 indicates that the object has not moved sufficiently away from the other objects pre-push location, the other object can remain at its pushed location and the method proceed to 1180.

At 1180, a determination is made as to whether the object is still moving. As mentioned above, the object avoidance is utilized while an object is in its "moving" state. Thus, if the object is still moving, the methodology returns from 1180 to 1110 to continue the object avoidance methodology. If the determination at 1180 is negative, indicating that the object is no longer moving, the methodology can end at 1190. This can coincide with a state change of the object, for example, such as in connection with releasing the moving object. The methodology can commence again if the object or another active object moves.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A graphical user interface comprising:
    a cluster indicator that represents a group of n objects visualized in an image space, where n is a natural number greater than or equal to 0, the cluster indicator comprising an annotation; and
    at least one graphical object dynamically visually associated with the group of objects represented by the cluster indicator based on a proximity of the at least one graphical object relative to the cluster indicator;
    wherein the at least one graphical object inherits at least a portion of the annotation from the cluster indicator based on the proximity of the at least one graphical object relative to the cluster indicator.

2. The interface of claim 1, further comprising a plurality of clusters, each of the plurality of clusters having a respective cluster indicator, membership of the at least one graphical object to one of the plurality of clusters being determined based on the proximity of the at least one graphical object relative to the respective cluster indicator of the one cluster.

3. The interface of claim 2, further comprising a clustering control that automatically associates the at least one graphical object with the one cluster.

4. The interface of claim 3, the clustering control limiting automatic association of the at least one graphical object to when the at least one graphical object is within a threshold distance of the respective cluster indicator of the one cluster.

5. The interface of claim 2, the plurality of clusters having a plurality of respective operating states based on interaction with a pointer represented in the image space, wherein a cluster selected via the pointer is capable of moving relative to the image space and other of the plurality of clusters, such that when the moving cluster is within a predetermined distance of another of the plurality of clusters, the another cluster is pushed away from the moving cluster.

6. The interface of claim 2, further comprising a cluster avoidance control that controls movement of the another cluster from a first position to a second position in response to the moving cluster being within the predetermined distance of the another cluster and, if the moving cluster has moved sufficiently away from the first position, the cluster avoidance control returning the another cluster to approximately the first position.

7. The interface of claim 2, the respective cluster indicators including different graphical elements to visually distinguish membership of the plurality of clusters.

8. The interface of claim 7, the at least one graphical object including a graphical element that substantially matches the graphical element of the one respective cluster indicator to which the at least one graphical object is associated to identify cluster membership.

9. The interface of claim 8, the graphical elements of the cluster indicators and of the at least one graphical object further comprising respective banners to indicated cluster membership.

10. The interface of claim 9, each of the banners further comprising at least one of a graphical and audio feature.

11. The interface of claim 1, the image space comprising a simulated three-dimensional image space.

12. The interface of claim 1, the annotation further comprising at least one of a textual annotation and an audio annotation associated with audio data.

13. The interface of claim 1, further comprising an import component operative to import selected objects into the interface, such that a graphical object associated with each respective imported object is visually represented in the image space.

14. The interface of claim 13, further comprising a clustering component operative to visually associate the graphical objects of respective imported objects with corresponding cluster indicators.

15. The interface of claim 14, the clustering component visually associating the graphical objects of imported objects with corresponding cluster indicators in the image space based on metadata of the imported objects.

16. The interface of claim 15, the clustering component visually associating the graphical objects of imported objects with corresponding cluster indicators in the image space based on similarities between the imported objects.

17. The interface of claim 13, the import component being operative to import graphical objects from at least one of a data file and a storage medium associated of a device external to a device running the interface.

18. The interface of claim 1, further comprising a scaling component operative to scale the at least one graphical object and the cluster indicator relative to the image space.

19. The interface of claim 18, the image space comprising a visualized surface relative to which the at least one graphical object and the cluster indicator are arranged, the scaling component performing scaling of the at least one graphical object and the cluster indicator without scaling the surface.

20. The interface of claim 19, the scaling component being operative to scale the at least one graphical object an amount proportionally different from the cluster indicator in response to a change in scaling.

21. The interface of claim 1, further comprising a plurality of the cluster indicators that represent different clusters, at least one of the plurality of cluster indicators comprising a cluster annotation, a plurality of the graphical objects visually associated with respective ones of the cluster indicators, the at least one graphical object being associated with the one of the plurality of cluster indicators such that the cluster annotation also is associated with the at least one graphical object.

22. The interface of claim 21, the at least one graphical object having a plurality of respective operating states based on interaction with a pointer represented in the image space, wherein, in response to selection of the at least one graphical object with the pointer, the at least one graphical object is capable of moving relative to the image space.

23. The interface of claim 22, further comprising a clustering control operative to dynamically associate the at least one graphical object with another of the plurality of cluster indicators in response to the at least one graphical object being moved to a position that is closer to the another cluster indicator than to the one of the plurality of cluster indicator.

24. The interface of claim 23, the at least one graphical object having cluster data that varies according to with which of the plurality of cluster indicators the at least one graphical object is associated.

25. The interface of claim 24, the cluster data further comprising at least a portion of cluster annotations of the cluster indicator with which the at least one graphical object is associated.

26. The interface of claim 25, the at least one graphical object further comprising programmable object annotations specific to the at least one graphical object.

27. The interface of claim 1, further comprising an export control operative to control sending data associated with the at least one graphical object to a desired destination.

28. The interface of claim 27, the desired destination comprising at least one of an external device, an application program, a data file and a website.

29. The interface of claim 1, further comprising an export control operative to control sending a cluster to a desired destination, the cluster comprising data associated with the cluster indicator, including the at least one graphical object.

30. The interface of claim 1, the at least one graphical object comprising a two-dimensional image.

31. The interface of claim 30, the two-dimensional image comprising a graphical representation of a photograph.

32. A graphical user interface to facilitate viewing of graphical representations of data in an image space, comprising:
at least one cluster indicator visualized in the image space to represent a group of n objects in the image space, where n is a natural number greater than or equal to 0, the at least one cluster indicator includes an annotation;
at least one graphical object in the image space visually associated with the at least one cluster indicator, at least a portion of the annotation is provided to the at least one graphical object based on the association; and
a scaling component operative to selectively scale the at least one graphical object and the at least one cluster indicator independently of the image space.

33. The interface of claim 32, the image space further comprising a simulated three-dimensional image spare that includes a visualized surface relative to which the at least one graphical object and the at least one cluster indicator are arranged, the scaling component performing scaling of the at least one graphical object and the cluster indicator without scaling the surface.

34. The interface of claim 32, the scaling component being operative to scale the at least one graphical object an amount proportionally different from the at least one cluster indicator in response to a change in scaling.

35. The interface of claim 32, the at least one graphical object being associated with the at least one cluster indicator based on a relative distance between the at least one graphical object and the cluster indicator.

36. The interface of claim 35, further comprising a plurality of clusters and a plurality of graphical objects, each of the plurality of clusters having a respective cluster indicator, membership of at least some of the plurality of graphical object to respective ones of the plurality of clusters being determined based on the relative distance between each of the at least some of the plurality of graphical objects and the plurality of cluster indicators.

37. The interface of claim 36, further comprising a clustering control that automatically associates each of the plurality of graphical objects with a respective one of the plurality of cluster indicators.

38. The interface of claim 37, the clustering control limiting automatic association of the graphical objects to where each graphical object is within a threshold distance of the respective one of the plurality of cluster indicators.

39. A graphical user interface to facilitate management of or access to data, comprising:
a plurality of cluster indicators visualized in the image space, each cluster indicator representing a cluster of objects in the image space number greater than or equal to 0;
at least one graphical object visually associated with one of the plurality cluster indicators;
cluster annotation associated with the one cluster indicator; and
at least a portion of the cluster annotation of the one cluster indicator inherited by the at least one graphical object as a function of the association between the at least one graphical object and the one cluster indicator.

40. The interface of claim 39, the at least one graphical object having a plurality of respective operating states based on interaction with a pointer represented in the image space, wherein, the at least one graphical object is capable of moving relative to the image space in response to manipulation of the at least one graphical object with the pointer.

41. The interface of claim 40, further comprising a clustering control operative to dynamically associate the at least one graphical object with the another cluster indicator in response to the at least one graphical object being moved to a position that is closer to the another cluster indicator than to the one cluster indicator.

42. The interface of claim 41, the at least one graphical object having cluster data that varies as a function of the association between the at least one graphical object and a corresponding cluster indicator.

43. The interface of claim 42, the cluster data further comprising cluster annotation data that varies based upon with which corresponding one of the plurality of cluster indicators the at least one graphical object is associated.

44. The interface of claim 43, the at least one graphical object further comprising programmable object annotations that are independent of an association between the at least one graphical object and a corresponding cluster indicator with which the at least one graphical object is associated.

45. The interface of claim 39, the at least one graphical object having cluster data that varies as a function of the association between the at least one graphical object and a corresponding cluster indicator, the cluster data including at least one graphical element visually represented with the at least one graphical object in the image space to indicate membership with the corresponding cluster indicator with which the at least one graphical object is associated.

46. The interface of claim 45, the graphical element of the at least one graphical object substantially matching a graphical element of the corresponding cluster indicator to which the at least one graphical object is associated to indicate common cluster membership.

47. The interface of claim 46, the graphical elements of the corresponding cluster indicator and the at least one graphical object further comprising respective color-coded banners.

48. A graphical user interface, comprising:
   means for representing of a group of n objects visualized relative to a surface in an image space, where n is a natural number greater than or equal to 0, the means for representing a group of objects comprising an annotation;
   means for graphically representing data in the image space; and
   means for visually associating the means for graphically representing data with the group represented by the means for representing the group of objects as a function of a distance between the means for graphically representing data and the means for representing the group of objects, and based on the association the means for graphically representing data visually associated with the group represented by the means for representing the group obtaining at least a portion of the annotation.

49. The interface of claim 48, the means for graphically representing data comprising a plurality of graphical objects, the interface further comprising means for automatically associating each of the graphical objects with a respective means for representing a group of objects based on the distance between the each of the graphical objects and the respective means for representing the group of objects.

50. The interface of claim 48, further comprising means for moving the group of objects in the image space relative to the surface, such that when the group of objects is within a predetermined distance of another group of objects, the another group is moved away from the moving cluster.

51. The interface of claim 48, further comprising means for selectively scaling the means for graphically representing data and the means for representing the group of objects independently of the surface in the image space.

52. The interface of claim 51, the means for scaling being operative to scale the means for graphically representing data an amount proportionally different from the means for representing the group of objects in response to a change in scaling.

53. A method to facilitate management or viewing of data, comprising:
   displaying at least one cluster indicator in an image space to represent a cluster that n number of objects visualized in image space where n is an integer greater than or equal to zero, the at least one cluster indicator including an annotation;
   providing at least one graphical object to represent data in the image space; and
   visually associating the at least one graphical object with the at least one cluster as a function of a distance between the at least one graphical object and the at least one cluster indicator to indicate cluster membership by the association, the at least one graphical object associated with the at least one cluster indicator inheriting at least a portion of the annotation from the at least one cluster indicator based on the association.

54. The method of claim 53, further comprising:
   displaying a plurality of cluster indicators in the image space, each of the plurality of cluster indicators representing a respective cluster; and
   determining membership of the at least one graphical object to one of the plurality of clusters based on the distance between the graphical object and the one cluster indicator.

55. The method of claim 54, a plurality of graphical objects being displayed in the image space, the method further comprising automatically associating each of graphical objects with one respective cluster based on the distance between each respective graphical object and the plurality of cluster indicators.

56. The method of claim 55, further comprising:
   moving at least one of the plurality of clusters relative to the image space and other of the plurality of clusters; and
   graphically pushing another of the plurality of clusters away from the moving cluster when the moving cluster is within a predetermined distance of the another of the plurality of clusters.

57. The method of claim 54, further comprising:
   importing at least one selected object into the image space, such that an associated graphical object for the imported object is visually represented in the image space; and
   visually associating the graphical objects of respective imported object with corresponding cluster indicators.

58. The method of claim 53, further comprising providing a substantially common graphical element at each of the at least one graphical object and the at least one cluster indicator to visualize cluster membership.

59. The method of claim 53, further comprising simulating the image space as a three-dimensional image space having a surface, the at least one graphical object and the at least one cluster indicator being arranged relative to the surface.

60. The method of claim 53, further comprising associating an annotation with the at least one cluster indicator.

61. The method of claim 53, further comprising scaling the at least one graphical object and the at least one cluster indicator relative to the image space.

62. The method of claim 61, the image space including a visualized surface relative to which the at least one graphical object and the cluster indicator are disposed, the scaling component performing scaling of the at least one graphical object and the at least one cluster indicator without scaling the surface.

63. The method of claim 61, the scaling being performed relative to the at least one graphical object an amount proportionally different from the at least one cluster indicator in response to change in scaling.

64. The method of claim 53, the image space including a plurality of cluster indicators that represent respective clusters, the method further comprising:
 selecting the at least one graphical object;
 moving the selected at least one graphical object in the image space; and
 dynamically associating the moving graphical object with another of the plurality of cluster indicators in response to the moving graphical object being moved to a position that is closer to the another cluster indicator than to the at least one cluster indicator.

65. The method of claim 64, further comprising modifying cluster data of the at least one graphical object to reflect a change in cluster membership based on the dynamic association with the another cluster indicator.

66. The method of claim 53, further comprising sending the cluster represented by the at least one cluster indicator to a desired destination.

67. The method of claim 53, further comprising sending at least some of the data represented by the at least one graphical object to a desired destination.

68. A computer-readable medium having computer-executable instructions for:
 displaying at least one cluster indicator in an image space to represent a cluster that includes n number of objects visualized in image space, where n is an integer greater than or equal to zero, the at least one cluster indicator includes an annotation;
 providing at least one graphical object to represent data in the image space; and
 visually associating the at least one graphical object with the at least one cluster as a function of a distance between the at least one graphical object and the at least one cluster indicator to indicate cluster membership by the association, resulting from the association the at least one graphical object receiving at least a portion of the annotation from the at least one cluster indicator.

* * * * *

UNITED STATES PATENT AND TRADEMARK OFFICE
CERTIFICATE OF CORRECTION

PATENT NO. : 6,968,511 B1
APPLICATION NO. : 10/092458
DATED : November 22, 2005
INVENTOR(S) : George G. Robertson et al.

It is certified that error appears in the above-identified patent and that said Letters Patent is hereby corrected as shown below:

Title Page;

On the face page, in field (56), under "U.S. Patent Documents", in column 1, line 1, above "6,188,405 B1  2/2001 Czerwinski et al.  345/339"
insert -- 6,054,989  4/2000  Robertson et al. --.

On the face page, in field (56), under "U.S. Patent Documents", in column 1, line 2, below "6,054,989  4/2000  Robertson et al."
insert -- 6,160,553  12/2000  Robertson et al. --.

On the face page, in field (56), under "U.S. Patent Documents", in column 1, line 3, below "6,160,553  12/2000  Robertson et al."
insert -- 6,166,738  12/2000  Robertson et al. --.

On the face page, in field (56), under "U.S. Patent Documents", in column 1, line 5, below "6,188,405 B1  2/2001 Czerwinski et al.  345/339"
insert -- 6,243,093 6/2001 Czerwinski, et al., --.

On the face page, in field (56), under "Other Publications", in column 2, line 6, below "J.C. Platt "AutoAlbum: Clustering Digital........p.1-5."
insert -- Bederson, Benjamin, B. PhotoMesa: A Zoomable Image Browser Using Quantum Treemaps and Bubblemaps, UIST, Pgs. 71-80, 2001. --.

On Sheet 23 of 26, in FIG. 24 (Below Box 840), line 1, delete "840" and insert -- 850 --, therefor.

UNITED STATES PATENT AND TRADEMARK OFFICE
CERTIFICATE OF CORRECTION

PATENT NO.          : 6,968,511 B1
APPLICATION NO. : 10/092458
DATED                   : November 22, 2005
INVENTOR(S)        : George G. Robertson et al.

It is certified that error appears in the above-identified patent and that said Letters Patent is hereby corrected as shown below:

In column 16, line 24, delete "predetermined" and insert -- pre-determined --, therefor.

In column 16, line 29, delete "predetermined" and insert -- pre-determined --, therefor.

In column 16, line 50, delete "predetermined" and insert -- pre-determined --, therefor.

In column 17, line 1, after "the" delete "a".

In column 18, line 45, delete "indicator" and insert -- indicators --, therefor.

In column 30, line 20, in Claim 33, delete "spare" and insert -- space --, therefor.

In column 30, line 53, in Claim 39, after "cluster of" insert -- n --.

In column 30, line 54, in Claim 39, after "space" insert -- , where n is a --.

In column 32, line 15, in Claim 53, after "that" insert -- includes --.

In column 32, line 16, in Claim 53, after "space" insert -- , --.

Signed and Sealed this

Eleventh Day of August, 2009

David J. Kappos
*Director of the United States Patent and Trademark Office*